US011811611B2

(12) United States Patent
Chen

(10) Patent No.: US 11,811,611 B2
(45) Date of Patent: Nov. 7, 2023

(54) SYSTEM AND METHOD FOR BACKUP FLOODING TOPOLOGY SPLIT

(71) Applicant: Huawei Technologies Co., Ltd., Guangdong (CN)

(72) Inventor: Huaimo Chen, Bolton, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 200 days.

(21) Appl. No.: 17/157,540

(22) Filed: Jan. 25, 2021

(65) Prior Publication Data

US 2021/0218637 A1 Jul. 15, 2021

Related U.S. Application Data

(63) Continuation of application No. PCT/US2019/038187, filed on Jun. 20, 2019.

(Continued)

(51) Int. Cl.
*H04L 41/12* (2022.01)
*H04L 41/0677* (2022.01)
(Continued)

(52) U.S. Cl.
CPC .......... *H04L 41/12* (2013.01); *H04L 41/0677* (2013.01); *H04L 45/12* (2013.01); *H04L 45/32* (2013.01)

(58) Field of Classification Search
None
See application file for complete search history.

(56) References Cited

U.S. PATENT DOCUMENTS 9,019,814 B1 * 4/2015 Mohanty ................. H04L 41/08
370/219
2004/0022257 A1 * 2/2004 Green ................. H04L 12/4641
370/401

(Continued)

FOREIGN PATENT DOCUMENTS

CN 101155135 A 4/2008
CN 102377666 A 3/2012
(Continued)

OTHER PUBLICATIONS

Wijnands, IJ, et al., "PIM Flooding Mechanism and Source Discovery," Network Working Group, draft-ietf-pim-source-discovery-bsr-10, Jan. 25, 2018, 20 pages.
(Continued)

*Primary Examiner* — Chi Ho A Lee
(74) *Attorney, Agent, or Firm* — Conley Rose, P.C.

(57) ABSTRACT

A method for encoding messages of a flooding topology and backup paths of the flooding topology. The method includes monitoring a status of a network, and detecting at least one network failure. The network failure is one of a link failure, a node failure, or both. A backup path for each of the links and nodes on a flooding topology is computed. The backup paths for a link are encoded in a link backup path (LBP) data structure. The LBP data structure for the link is encoded in a LBP type-length-value (TLV). The encoded LBP-TLV comprising the encoded LBP data structure for the link is encoded in a backup paths opaque link state advertisement (LSA). The flooding topology is flooded with the backup paths opaque LSA.

23 Claims, 20 Drawing Sheets

Related U.S. Application Data

(60) Provisional application No. 62/730,103, filed on Sep. 12, 2018.

(51) Int. Cl.
  *H04L 45/12* (2022.01)
  *H04L 45/00* (2022.01)

(56) References Cited

U.S. PATENT DOCUMENTS

| | | | | |
|---|---|---|---|---|
| 2004/0249976 | A1* | 12/2004 | Neustadter | H04Q 11/0062 709/230 |
| 2007/0014573 | A1* | 1/2007 | Wei | H04B 10/275 398/59 |
| 2008/0049622 | A1* | 2/2008 | Previdi | H04L 43/00 370/237 |
| 2008/0144493 | A1* | 6/2008 | Yeh | H04W 74/0816 370/230 |
| 2008/0225864 | A1* | 9/2008 | Aissaoui | H04L 45/50 370/255 |
| 2011/0273980 | A1* | 11/2011 | Ashwood Smith | H04L 41/0668 370/225 |
| 2012/0044940 | A1* | 2/2012 | Katz | H04L 12/462 370/400 |
| 2012/0224510 | A1 | 9/2012 | Bulusu et al. | |
| 2013/0016605 | A1* | 1/2013 | Chen | H04L 45/22 370/221 |
| 2013/0089005 | A1* | 4/2013 | Li | H04L 45/025 370/255 |
| 2013/0121156 | A1 | 5/2013 | Rege | |
| 2013/0272112 | A1* | 10/2013 | Aoshima | H04L 49/557 370/217 |
| 2014/0269410 | A1* | 9/2014 | Shah | H04L 45/32 370/254 |
| 2016/0255428 | A1* | 9/2016 | Ghimire | H04Q 11/0062 398/79 |
| 2016/0373336 | A1* | 12/2016 | Chen | H04L 69/22 |
| 2017/0093612 | A1* | 3/2017 | Singh | H05K 999/99 |
| 2018/0198712 | A1* | 7/2018 | Gao | H04L 12/66 |
| 2020/0322260 | A1* | 10/2020 | Kaliyamoorthy | H04L 45/28 |

FOREIGN PATENT DOCUMENTS

| | | |
|---|---|---|
| CN | 102845047 A | 12/2012 |
| CN | 105515983 A | 4/2016 |
| EP | 2571212 A2 | 3/2013 |
| JP | 2013172196 A * | 9/2013 |

OTHER PUBLICATIONS

Chen, et al, "LS Flooding Reduction," draft-cc-ospf-flooding-reduction-04, Sep. 20, 2018, 42 pages.
Colton, et al, "OSPF for IPv6," RFC 2740, Dec. 1999, 80 pages.
Coltun, "The OSPF Opaque LSA Option," RFC 2370, Jul. 1998, 15 pages.
Katz, et al., "Traffic Engineering (TE) Extensions to OSPF Version 2," RFC 3630, Sep. 2003, 14 pages.
Li, et al., "Dynamic Flooding on Dense Graphs," draft-li-dynamic-flooding-05, Jun. 28, 2018, 28 pages.
Moy, "OSPF Version 2," RFC 2328, Apr. 1998, 244 pages.
Chen, Z., et al., "Minimal coding cost and low delay multicast routing of wireless mesh networks," Journal on Communications, vol. 37, No. 1, Jan. 2016, with the English Abstract, 7 pages.
Fan, Y., et al., "Flooding With Network Coding Under a Schedule-Based Spanning Tree in Low-Duty-Cycle Wireless Sensor Networks," IEEE Wireless Communications Letters, vol. 7, No. 2, Apr. 2018, 4 pages.

* cited by examiner

```
500

0                   1                   2                   3
          0 1 2 3 4 5 6 7 8 9 0 1 2 3 4 5 6 7 8 9 0 1 2 3 4 5 6 7 8 9 0 1
         +-+-+-+-+-+-+-+-+-+-+-+-+-+-+-+-+-+-+-+-+-+-+-+-+-+-+-+-+-+-+-+-+
         |      NBP-TLV-Type  502        |       TLV-Length  504         |
         +-+-+-+-+-+-+-+-+-+-+-+-+-+-+-+-+-+-+-+-+-+-+-+-+-+-+-+-+-+-+-+-+
506~~~~~~|Node1 Index Enc|   Variable bits
         +-+-+-+-+-+-+-+-+-+-+-+-+-+-+-+-+-+-+-+-+-+-+-+-+-+-+-+-+-+-+-+-+
         :                  Node1 backup paths encoding 510              :
         +-+-+-+-+-+-+-+-+-+-+-+-+-+-+-+-+-+-+-+-+-+-+-+-+-+-+-+-+-+-+-+-+
512~~~~~~|Node2 Index Enc|   Variable bits
         +-+-+-+-+-+-+-+-+-+-+-+-+-+-+-+-+-+-+-+-+-+-+-+-+-+-+-+-+-+-+-+-+
         :                  Node2 backup paths encoding 516              :
         +-+-+-+-+-+-+-+-+-+-+-+-+-+-+-+-+-+-+-+-+-+-+-+-+-+-+-+-+-+-+-+-+
```

0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    |       LBP-TLV-Type (TBD2) 702 |         TLV-Length 704        |
    +-+-+-+-+-+-+-+-+-+-+-+-+-+-+-+-+-+-+-+-+-+-+-+-+-+-+-+-+-+-+-+-+
706~|Link1 Index Enc|  Variable bits
    +-+-+-+-+-+-+-+-+-+-+-+-+-+-+-+-+-+-+-+-+-+-+-+-+-+-+-+-+-+-+-+-+
    :                  Link1 backup paths encoding 710              :
    +-+-+-+-+-+-+-+-+-+-+-+-+-+-+-+-+-+-+-+-+-+-+-+-+-+-+-+-+-+-+-+-+
712~|Link2 Index Enc|  Variable bits
    +-+-+-+-+-+-+-+-+-+-+-+-+-+-+-+-+-+-+-+-+-+-+-+-+-+-+-+-+-+-+-+-+
    :                  Link2 backup paths encoding 716              :
    +-+-+-+-+-+-+-+-+-+-+-+-+-+-+-+-+-+-+-+-+-+-+-+-+-+-+-+-+-+-+-+-+
```

*FIG. 7*

```
800A 0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |         LS age  802           | 804 Options  | LS Type = 10   |~806
   +-+-+-+-+-+-+-+-+-+-+-+-+-+-+-+-+-+-+-+-+-+-+-+-+-+-+-+-+-+-+-+-+
808~| BP Type(TBD3) |                Instance ID  810              |
   +-+-+-+-+-+-+-+-+-+-+-+-+-+-+-+-+-+-+-+-+-+-+-+-+-+-+-+-+-+-+-+-+
   |                      Advertising Router  812                  |
   +-+-+-+-+-+-+-+-+-+-+-+-+-+-+-+-+-+-+-+-+-+-+-+-+-+-+-+-+-+-+-+-+
   |                      LS Sequence Number  814                  |
   +-+-+-+-+-+-+-+-+-+-+-+-+-+-+-+-+-+-+-+-+-+-+-+-+-+-+-+-+-+-+-+-+
   |       LS checksum  816        |           Length  818         |
   +-+-+-+-+-+-+-+-+-+-+-+-+-+-+-+-+-+-+-+-+-+-+-+-+-+-+-+-+-+-+-+-+
   |                                                               |
   ~            Link and Node Backup Paths TLVs  820               ~
   +-+-+-+-+-+-+-+-+-+-+-+-+-+-+-+-+-+-+-+-+-+-+-+-+-+-+-+-+-+-+-+-+
```

*FIG. 8A*

```
800B 822 823
    0                   1      \  \  2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |         LS age  802           |1 1 0 1 1|    BP-LSA (TBD4) 824 |
   +-+-+-+-+-+-+-+-+-+-+-+-+-+-+-+-+-+-+-+-+-+-+-+-+-+-+-+-+-+-+-+-+
   |                       Link State ID  826                      |
   +-+-+-+-+-+-+-+-+-+-+-+-+-+-+-+-+-+-+-+-+-+-+-+-+-+-+-+-+-+-+-+-+
   |                      Advertising Router  812                  |
   +-+-+-+-+-+-+-+-+-+-+-+-+-+-+-+-+-+-+-+-+-+-+-+-+-+-+-+-+-+-+-+-+
   |                      LS Sequence Number  814                  |
   +-+-+-+-+-+-+-+-+-+-+-+-+-+-+-+-+-+-+-+-+-+-+-+-+-+-+-+-+-+-+-+-+
   |       LS checksum  816        |           Length  818         |
   +-+-+-+-+-+-+-+-+-+-+-+-+-+-+-+-+-+-+-+-+-+-+-+-+-+-+-+-+-+-+-+-+
   |                                                               |
   ~            Link and Node Backup Paths TLVs  820               ~
   +-+-+-+-+-+-+-+-+-+-+-+-+-+-+-+-+-+-+-+-+-+-+-+-+-+-+-+-+-+-+-+-+
```

0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |      FTLK-TLV-Type (TBD) 1002 |         TLV-Length 1004       |
   +-+-+-+-+-+-+-+-+-+-+-+-+-+-+-+-+-+-+-+-+-+-+-+-+-+-+-+-+-+-+-+-+
   ~           Links Encoding (Node 1 to its Remote Nodes) 1006    ~
   +-+-+-+-+-+-+-+-+-+-+-+-+-+-+-+-+-+-+-+-+-+-+-+-+-+-+-+-+-+-+-+-+
   ~           Links Encoding (Node 2 to its Remote Nodes) 1008    ~
   +-+-+-+-+-+-+-+-+-+-+-+-+-+-+-+-+-+-+-+-+-+-+-+-+-+-+-+-+-+-+-+-+
   ~                                                               ~
   ~                                                               ~
   +-+-+-+-+-+-+-+-+-+-+-+-+-+-+-+-+-+-+-+-+-+-+-+-+-+-+-+-+-+-+-+-+
   ~           Links Encoding (Node N to its Remote Nodes) 1010    ~
   +-+-+-+-+-+-+-+-+-+-+-+-+-+-+-+-+-+-+-+-+-+-+-+-+-+-+-+-+-+-+-+-+
```

*FIG. 10*

```
1100A
                      1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |          LS age 1102          | 1104 Options  | LS Type = 10  |~1106
 +-+-+-+-+-+-+-+-+-+-+-+-+-+-+-+-+-+-+-+-+-+-+-+-+-+-+-+-+-+-+-+-+
1108~| FT Type(TBD6) |                 Instance ID 1110           |
 +-+-+-+-+-+-+-+-+-+-+-+-+-+-+-+-+-+-+-+-+-+-+-+-+-+-+-+-+-+-+-+-+
 |                    Advertising Router 1112                    |
 +-+-+-+-+-+-+-+-+-+-+-+-+-+-+-+-+-+-+-+-+-+-+-+-+-+-+-+-+-+-+-+-+
 |                    LS Sequence Number 1114                    |
 +-+-+-+-+-+-+-+-+-+-+-+-+-+-+-+-+-+-+-+-+-+-+-+-+-+-+-+-+-+-+-+-+
 |       LS checksum 1116        |          Length 1118          |
 +-+-+-+-+-+-+-+-+-+-+-+-+-+-+-+-+-+-+-+-+-+-+-+-+-+-+-+-+-+-+-+-+
 |                                                               |
 ~                 Flooding Topology Links TLV    1120            ~
 +-+-+-+-+-+-+-+-+-+-+-+-+-+-+-+-+-+-+-+-+-+-+-+-+-+-+-+-+-+-+-+-+
```

*FIG. 11A*

```
1100B
                              1122 1123
  0                   1           \    \  2                   3
  0 1 2 3 4 5 6 7 8 9 0 1 2 3 4 5 \6 7 \8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |          LS age 1102          |1|0|1|    FT-LSA (TBD7) 1124   |
 +-+-+-+-+-+-+-+-+-+-+-+-+-+-+-+-+-+-+-+-+-+-+-+-+-+-+-+-+-+-+-+-+
 |                      Link State ID 1126                       |
 +-+-+-+-+-+-+-+-+-+-+-+-+-+-+-+-+-+-+-+-+-+-+-+-+-+-+-+-+-+-+-+-+
 |                    Advertising Router 1112                    |
 +-+-+-+-+-+-+-+-+-+-+-+-+-+-+-+-+-+-+-+-+-+-+-+-+-+-+-+-+-+-+-+-+
 |                    LS Sequence Number 1114                    |
 +-+-+-+-+-+-+-+-+-+-+-+-+-+-+-+-+-+-+-+-+-+-+-+-+-+-+-+-+-+-+-+-+
 |       LS checksum 1116        |          Length 1118          |
 +-+-+-+-+-+-+-+-+-+-+-+-+-+-+-+-+-+-+-+-+-+-+-+-+-+-+-+-+-+-+-+-+
 |                                                               |
 ~                 Flooding Topology Links TLV    1120            ~
 +-+-+-+-+-+-+-+-+-+-+-+-+-+-+-+-+-+-+-+-+-+-+-+-+-+-+-+-+-+-+-+-+
```

0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    :            Local Node with backup paths encoding 1302         :
    +-+-+-+-+-+-+-+-+-+-+-+-+-+-+-+-+-+-+-+-+-+-+-+-+-+-+-+-+-+-+-+-+
    | NN   |~1304
    +-+-+-+
    | ENSI |~1306
    +-+-+-+-+-+-+-+-+-+-+-+-+-+-+-+-+-+-+-+-+-+-+-+-+-+-+-+-+-+-+-+-+
    :          Remote Node RN1 with backup paths encoding 1308      :
    +-+-+-+-+-+-+-+-+-+-+-+-+-+-+-+-+-+-+-+-+-+-+-+-+-+-+-+-+-+-+-+-+
    :              Link1 backup paths Encoding 1310                 :
    +-+-+-+-+-+-+-+-+-+-+-+-+-+-+-+-+-+-+-+-+-+-+-+-+-+-+-+-+-+-+-+-+
    :          Remote Node RN2 with backup paths encoding 1312      :
    +-+-+-+-+-+-+-+-+-+-+-+-+-+-+-+-+-+-+-+-+-+-+-+-+-+-+-+-+-+-+-+-+
    :              Link2 backup paths Encoding 1314                 :
    +-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     LNSBP-TLV-Type (TBD8) 1602  |        TLV-Length  1604      |
+-+-+-+-+-+-+-+-+-+-+-+-+-+-+-+-+-+-+-+-+-+-+-+-+-+-+-+-+-+-+-+-+
:         Links from Node 1 with backup paths encoding 1606     :
+-+-+-+-+-+-+-+-+-+-+-+-+-+-+-+-+-+-+-+-+-+-+-+-+-+-+-+-+-+-+-+-+
:         Links from Node 2 with backup paths encoding 1608     :
+-+-+-+-+-+-+-+-+-+-+-+-+-+-+-+-+-+-+-+-+-+-+-+-+-+-+-+-+-+-+-+-+
:                              1610                             :
.                                                               .
+-+-+-+-+-+-+-+-+-+-+-+-+-+-+-+-+-+-+-+-+-+-+-+-+-+-+-+-+-+-+-+-+
:         Links from Node N with backup paths encoding 1612     :
+-+-+-+-+-+-+-+-+-+-+-+-+-+-+-+-+-+-+-+-+-+-+-+-+-+-+-+-+-+-+-+-+
```

0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    |         LS age  1702          | 1704 Options  | LS Type = 10  |~1706
    +-+-+-+-+-+-+-+-+-+-+-+-+-+-+-+-+-+-+-+-+-+-+-+-+-+-+-+-+-+-+-+-+
1708~|FTBP Type(TBD9)|                 Instance ID  1710            |
    +-+-+-+-+-+-+-+-+-+-+-+-+-+-+-+-+-+-+-+-+-+-+-+-+-+-+-+-+-+-+-+-+
    |                     Advertising Router  1712                  |
    +-+-+-+-+-+-+-+-+-+-+-+-+-+-+-+-+-+-+-+-+-+-+-+-+-+-+-+-+-+-+-+-+
    |                     LS Sequence Number  1714                  |
    +-+-+-+-+-+-+-+-+-+-+-+-+-+-+-+-+-+-+-+-+-+-+-+-+-+-+-+-+-+-+-+-+
    |        LS checksum  1716      |         Length  1718          |
    +-+-+-+-+-+-+-+-+-+-+-+-+-+-+-+-+-+-+-+-+-+-+-+-+-+-+-+-+-+-+-+-+
    |                                                               |
    ~              Links with Backup Paths TLV  1720                ~
    +-+-+-+-+-+-+-+-+-+-+-+-+-+-+-+-+-+-+-+-+-+-+-+-+-+-+-+-+-+-+-+-+
```

1722  1723
     0                   1             \   \   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    |         LS age  1702          |1|0|1|   FTBP-LSA (TBDa) 1724 |
    +-+-+-+-+-+-+-+-+-+-+-+-+-+-+-+-+-+-+-+-+-+-+-+-+-+-+-+-+-+-+-+-+
    |                       Link State ID  1726                     |
    +-+-+-+-+-+-+-+-+-+-+-+-+-+-+-+-+-+-+-+-+-+-+-+-+-+-+-+-+-+-+-+-+
    |                     Advertising Router  1712                  |
    +-+-+-+-+-+-+-+-+-+-+-+-+-+-+-+-+-+-+-+-+-+-+-+-+-+-+-+-+-+-+-+-+
    |                     LS Sequence Number  1714                  |
    +-+-+-+-+-+-+-+-+-+-+-+-+-+-+-+-+-+-+-+-+-+-+-+-+-+-+-+-+-+-+-+-+
    |        LS checksum  1716      |         Length  1718          |
    +-+-+-+-+-+-+-+-+-+-+-+-+-+-+-+-+-+-+-+-+-+-+-+-+-+-+-+-+-+-+-+-+
    |                                                               |
    ~              Links with Backup Paths TLV  1720                ~
    +-+-+-+-+-+-+-+-+-+-+-+-+-+-+-+-+-+-+-+-+-+-+-+-+-+-+-+-+-+-+-+-+
```

*FIG. 17B* ght# SYSTEM AND METHOD FOR BACKUP FLOODING TOPOLOGY SPLIT

CROSS-REFERENCE TO RELATED APPLICATIONS

This application is a continuation of International Application No. PCT/US2019/038187 filed on Jun. 20, 2019, by Futurewei Technologies, Inc., and titled "System and Method for Backup Flooding Topology Split," which claims the benefit of U.S. Provisional Patent Application No. 62/730,103 filed Sep. 12, 2018, by Huaimo Chen and titled "Backup Flooding Topology Split," each of which is hereby incorporated by reference.

TECHNICAL FIELD

The present disclosure relates generally to network communication, and more specifically to quickly flooding link state (LS) to every node when a flooding topology is split because of link and/or node failures.

BACKGROUND

A topology is the arrangement of the communicating devices of the network wherein the communicating devices are modeled as nodes and the connections between the devices are modeled as links or lines between the nodes. A flooding topology is a sub-graph or sub-network of a given (physical) network topology that has the same reachability to every node as the given network topology. Flooding is the forwarding of a packet from any node to every other node attached to the node except the node from which the packet arrived. All the nodes that receive the packet in the network are part of a flooding topology of the network.

SUMMARY

The present disclosure relates to flooding topology failures that may split a flooding topology even though the underline (physical) topology is not split. With the embodiments proposed in this disclosure, backup paths for a critical link and/or node can be computed and used on the remaining flooding topology to quickly flood a link state (LS) to every node in the network. Moreover, backup paths for every non critical link and node on the flooding topology can also be computed. When the failures of multiple links and nodes on the flooding topology happen, through the remaining flooding topology and the backup paths for these links and nodes, an LS can be quickly flooded to every live node in the network.

A first aspect relates to a method for encoding messages of a flooding topology and backup paths of the flooding topology. The method includes monitoring a status of a network, and detecting at least one network failure. The network failure is one of a link failure, a node failure, or both. A flooding topology and backup path for each of the links and nodes on the flooding topology is computed. The backup paths for a link are encoded in a link backup path (LBP) data structure. The LBP data structure for the link is encoded in a LBP type-length-value (TLV). The encoded LBP-TLV comprising the encoded LBP data structure for the link is encoded in in a backup paths opaque link state advertisement (LSA). The flooding topology is flooded with the backup paths opaque LSA.

A second aspect relates to a network device for encoding messages of a flooding topology and backup paths of the flooding topology. The network device includes a network interface configured to send and receive really data over a network; memory configured to store instructions; and a processor. The processor is configured to execute the instructions to: monitor a status of a network; detect at least one network failure, wherein the network failure is one of a link failure, a node failure, or both; compute a backup path for each of the links and nodes on a flooding topology; encode backup paths for a link in a link backup path (LBP) data structure; encode the encoded LBP data structure for the link in a LBP type-length-value (TLV); encode the encoded LBP-TLV comprising the encoded LBP data structure for the link in a backup paths opaque link state advertisement (LSA); and flood the flooding topology with the backup paths opaque LSA.

In a first implementation form according to the any of the preceding aspect, the backup paths for the node are encoded in a node backup path (NBP) data structure. The encoded NBP data structure for the node is encoded in a NBP-TLV. The encoded NBP-TLV comprising the encoded NBP data structure for the node is encoded in a backup paths opaque LSA. The flooding topology is flooded with the backup paths opaque LSA.

In a second implementation form according to any of the preceding aspect or any of the preceding implementation form of any of the preceding aspect, both the LBP-TLV and the NBP-TLV are encoded in the modified open shortest path first (OSPF) message.

In a third implementation form according to any of the preceding aspect or any of the preceding implementation form of any of the preceding aspect, the link is a critical link.

In a fourth implementation form according to any of the preceding aspect or any of the preceding implementation form of any of the preceding aspect, the link is a non-critical link.

In a sixth implementation form according to any of the preceding aspect or any of the preceding implementation form of any of the preceding aspect, the node is a critical node.

In a seventh implementation form according to any of the preceding aspect or any of the preceding implementation form of any of the preceding aspect, the node is a non-critical node.

In an eighth implementation form according to any of the preceding aspect or any of the preceding implementation form of any of the preceding aspect, a flooding topology links (FTLK)-TLV comprising a plurality of links encoding of all links on the flooding topology is encoded, wherein each links encoding in the plurality of links encoding encodes links between a local node and a number of remote nodes. The FTLK-TLV is encoded in a flooding topology opaque LSA. The flooding topology is flooded with the flooding topology opaque LSA.

In a ninth implementation form according to any of the preceding aspect or any of the preceding implementation form of any of the preceding aspect, flooding the flooding topology is initiated by a leader of an area to all the other nodes in the area.

In a tenth implementation form according to any of the preceding aspect or any of the preceding implementation form of any of the preceding aspect, the backup paths opaque LSA and flooding topology opaque LSA supports OSPF version 2 (OSPFv2).

In an eleventh implementation form according to any of the preceding aspect or any of the preceding implementation form of any of the preceding aspect, the backup paths opaque LSA and flooding topology opaque LSA supports OSPFv3.

A third aspect relates to a method performed by a node for computing a flooding topology and backup paths of the flooding topology. The method includes monitoring a status of a network for detecting at least one network failure. The network is one of a link failure, a node failure, or both. Backup paths for each of the links and nodes on a flooding topology are computed. The links on the backup path is added to the flooding topology temporarily until a new flooding topology is computed by a leader and is received by the node computing the backup paths.

A fourth aspect relates to a network node for computing a flooding topology and backup paths of the flooding topology. The network device includes a network interface configured to send and receive really data over a network; memory configured to store instructions; and a processor. The processor is configured to execute the instructions for: monitoring a status of a network; detecting at least one network failure, wherein the network is one of a link failure, a node failure, or both; computing backup paths for each of the links and nodes on a flooding topology; and adding the links on the backup path to the flooding topology temporarily until a new flooding topology is computed by a leader and is received by the node computing the backup paths.

In a first implementation form according to the third or fourth aspect, the node computes the backup path and adds each of the links connected to the node and on the backup path to the flooding topology temporarily if the link is not on the flooding topology and if there is no path on the flooding topology from the node to a remote end node of the link.

For the purpose of clarity, any one of the foregoing implementations may be combined with any one or more of the other foregoing implementations to create a new embodiment within the scope of the present disclosure.

These and other features will be more clearly understood from the following detailed description taken in conjunction with the accompanying drawings and claims.

BRIEF DESCRIPTION OF THE DRAWINGS

FIG. 5 is a schematic drawing illustrating a node backup paths type-length-value (TLV) encoding in accordance with an embodiment of the present disclosure.

FIG. 7 is a schematic drawing illustrating a link backup paths (LBP) TLV encoding in accordance with an embodiment of the present disclosure.

FIG. 8A is a schematic drawing illustrating a backup paths opaque link state advertisement (LSA) encoding for OSPFv2 in accordance with an embodiment of the present disclosure.

FIG. 8B is a schematic drawing illustrating a backup paths opaque LSA encoding for OSPFv3 in accordance with another embodiment of the present disclosure.

FIG. 10 is a schematic drawing illustrating a FTLK TLV encoding in accordance with an embodiment of the present disclosure.

FIG. 11A is a schematic drawing illustrating a flooding topology opaque LSA encoding for OSPFv2 in accordance with an embodiment of the present disclosure.

FIG. 11B is a schematic drawing illustrating a flooding topology opaque LSA encoding for OSPFv3 in accordance with an embodiment of the present disclosure.

FIG. 13 is a schematic drawing illustrating a links from a node with backup paths encoding in accordance with an embodiment of the present disclosure.

FIG. 16 is a schematic drawing illustrating a links with backup paths (LNSBP) TLV encoding in accordance with an embodiment of the present disclosure.

FIG. 17A is a schematic drawing illustrating a flooding topology with backup paths (FTBP) opaque LSA encoding for OSPFv2 in accordance with an embodiment of the present disclosure.

FIG. 17B is a schematic drawing illustrating a FTBP opaque LSA encoding for OSPFv3 in accordance with an embodiment of the present disclosure.

For a more complete understanding of this disclosure, reference is now made to the following brief description, taken in connection with the accompanying drawings and detailed description, wherein like reference numerals represent like parts.

DETAILED DESCRIPTION

Figure 1:
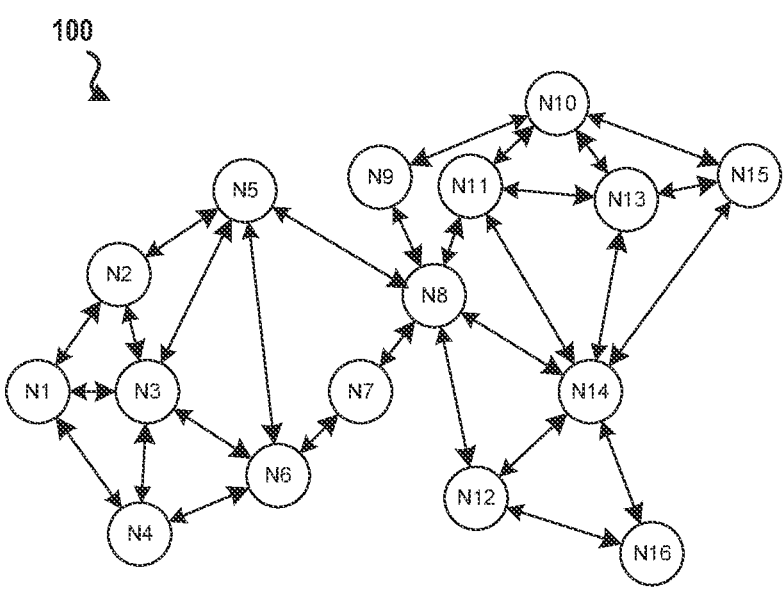
FIG. 1 is a schematic drawing illustrating a flooding network topology in accordance with an embodiment of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to".

Unless otherwise indicated, as used throughout this document, "or" does not require mutual exclusivity, and the singular forms "a", "an" and "the" are intended to include the plural forms as well, unless the context clearly indicates otherwise.

A module as referenced herein may comprise of software components such as, but not limited to, data access objects, data structures, functions, service components, user interface components, application programming interface (API) components; hardware components such as electrical circuitry, processors, and memory; and/or a combination thereof. The memory may be volatile memory or non-volatile memory that stores data and computer executable instructions. The computer executable instructions may be in any form including, but not limited to, machine code, assembly code, and high-level programming code written in any programming language. The module may be configured to use the data to execute one or more instructions to perform one or more tasks.

Unless otherwise stated, the various methods or processes described herein may be performed on any type of system or device having a processor capable of executing instructions that implement the process. The instructions may be stored in a data storage component or a memory unit of the system. The instructions may be written in any type of programming language and may be packaged in a software application or be integrated as a system function.

The present disclosure relates to network communication, and more specifically to quickly flooding LS to every node when a flooding topology is split because of link and/or node failures. A node is a system or device such as, but not limited to, a network router. A link is a network connection or interface between two nodes. When a critical link on the flooding topology fails, the flooding topology without the critical link (i.e., the remaining flooding topology) is split into two parts. A critical link or interface on a flooding topology is a link that is the only link or interface among some nodes on the flooding topology. When this link or interface goes down, the flooding topology will be split. In accordance with the disclosed embodiments, a backup path for the critical link is created to connect the two parts into one. Through the backup path and the remaining flooding topology, an LS can be quickly flooded to every node in the network. A backup path is a path or a sequence of links, when a critical link or node goes down, that provides a connection to connect two parts of a split flooding topology. A remaining flooding topology is a topology from a flooding topology by removing the failed links and nodes from the flooding topology. The combination of the backup path and the flooding topology is tolerant to the failure of the critical link.

A critical node on a flooding topology is a node that is the only node connecting some nodes on the flooding topology. When a critical node on the flooding topology goes down, the remaining flooding topology is split into two or more parts, as opposed to just two parts when a critical link goes down. In this case, one or more backup paths are created for the critical node that connects the split parts of the remaining flooding topology into one. Through the backup paths and the remaining flooding topology, an LS can be quickly flooded to every live node in the network. The combination of the backup paths and the flooding topology is tolerant to the failure of the critical node.

In addition to the backup paths for a critical link and node, backup paths for every non critical link and node on the flooding topology can be computed. For instance, when the failures of multiple links and nodes on the flooding topology happen, through the remaining flooding topology and the backup paths for these links and nodes, an LS can be quickly flooded to every live node in the network. The combination of the backup paths and the flooding topology is tolerant to the failures of these links and nodes. If there are other failures that break the backup paths, an LS can be quickly flooded to every live node by the traditional flooding procedure.

Thus, using the embodiments proposed in this disclosure, a new flooding topology can be efficiently computed and built to enable flooding of the new flooding topology in response a flooding topology split due to a failure of a critical node, a critical link, or multiple non critical links and/or nodes. The disclosed embodiments greatly reduce the amount of LS flooding and are tolerant to multiple failures.

For a more complete understanding of this disclosure, reference is now made to FIG. 1, which is a schematic drawing illustrating a flooding network topology 100 in accordance with an embodiment of the present disclosure. The flooding network topology 100 is a sub-network of a physical network topology. The flooding network topology 100 enables updates about routing information such as link state advertisements (LSAs) to be quickly distributed by flooding the routing information from any node (nodes N1-N16) to every other node attached to the node except the node from which the packet arrived. An LSA contains routing and topology information that describe parts of an open shortest path first (OSPF) network. LSAs are used by routers running OSPF to exchange topology information. OSPF is a routing protocol for Internet Protocol (IP) networks. OSPF version 2 (OSPFv2) is defined for IPv4, and OSPFv3 is defined for IPv6. In various embodiments, OSPF is extended to support link and node backup paths TLVs as described herein.

Figure 2:
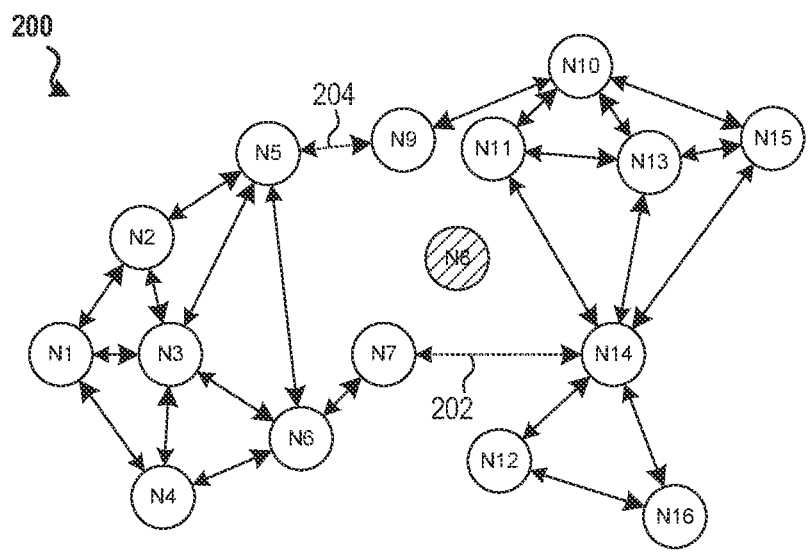
FIG. 2 is a schematic drawing illustrating a split flooding network topology in accordance with an embodiment of the present disclosure.

FIG. 2 is a schematic drawing illustrating a split flooding network topology 200 in accordance with an embodiment of the present disclosure. The split flooding network topology 200 is a result of a failure of node N8 in the flooding network topology 100. Node N8 is a critical node because it is the only node connecting nodes N1-N7 to nodes N9-16 in the flooding network topology 100. Thus, when node N8 goes down, the remaining flooding topology is split into two or more parts. For instance, in the illustrated example, the split flooding network topology 200 comprises of two parts, a first part comprising node N1-N7, and a second part comprising node N9-16. In this case, one or more backup paths are created for the critical node that connects the split parts of the remaining flooding topology into one. As an example, a backup path 202 can be created to connect node N7 to N14. Another backup path 204 can be created to connect node N5 to N9. Through the backup path (202 and 204) and the remaining flooding topology, an LS can be quickly flooded to every live node in the remaining flooding topology.

It should be noted that the disclosed embodiments are not limited to the constructed flooding topologies illustrated in FIG. 1 and FIG. 2. Many different flooding topologies can be constructed for a given network topology. A chain connecting all the nodes in the given network topology is a flooding topology. A circle connecting all the nodes is another flooding topology. A tree connecting all the nodes is a flooding topology. In addition, the tree plus the connections between some leaves of the tree and branch nodes of the tree is a flooding topology. Additionally, it should be noted that although the backup path 202 and the backup path 204 are created by connecting just two nodes together respectively, a backup path may consist of several nodes being connected or linked together.

The disclosed embodiments can be performed in a centralized mode and/or in a distributed mode. In a distributed mode, every node of a flooding topology computes the backup paths. In a centralized mode, a leader node or leader computes the backup paths and floods them to all the other nodes. The leader may be a node with a highest priority and/or a node that has higher computing resources than the other nodes on the remaining flooding topology. When the leader of an area computes a flooding topology, it may compute a backup path or multiple backup paths for a critical link on the flooding topology. When the critical link fails, a link state can be distributed to every node in the area through one backup path and other links on the flooding topology. In addition, it may compute a backup path or multiple backup paths for a node. When the node fails, a link state can be distributed to the other nodes in the area through the backup paths and the links on the flooding topology.

Figure 3:
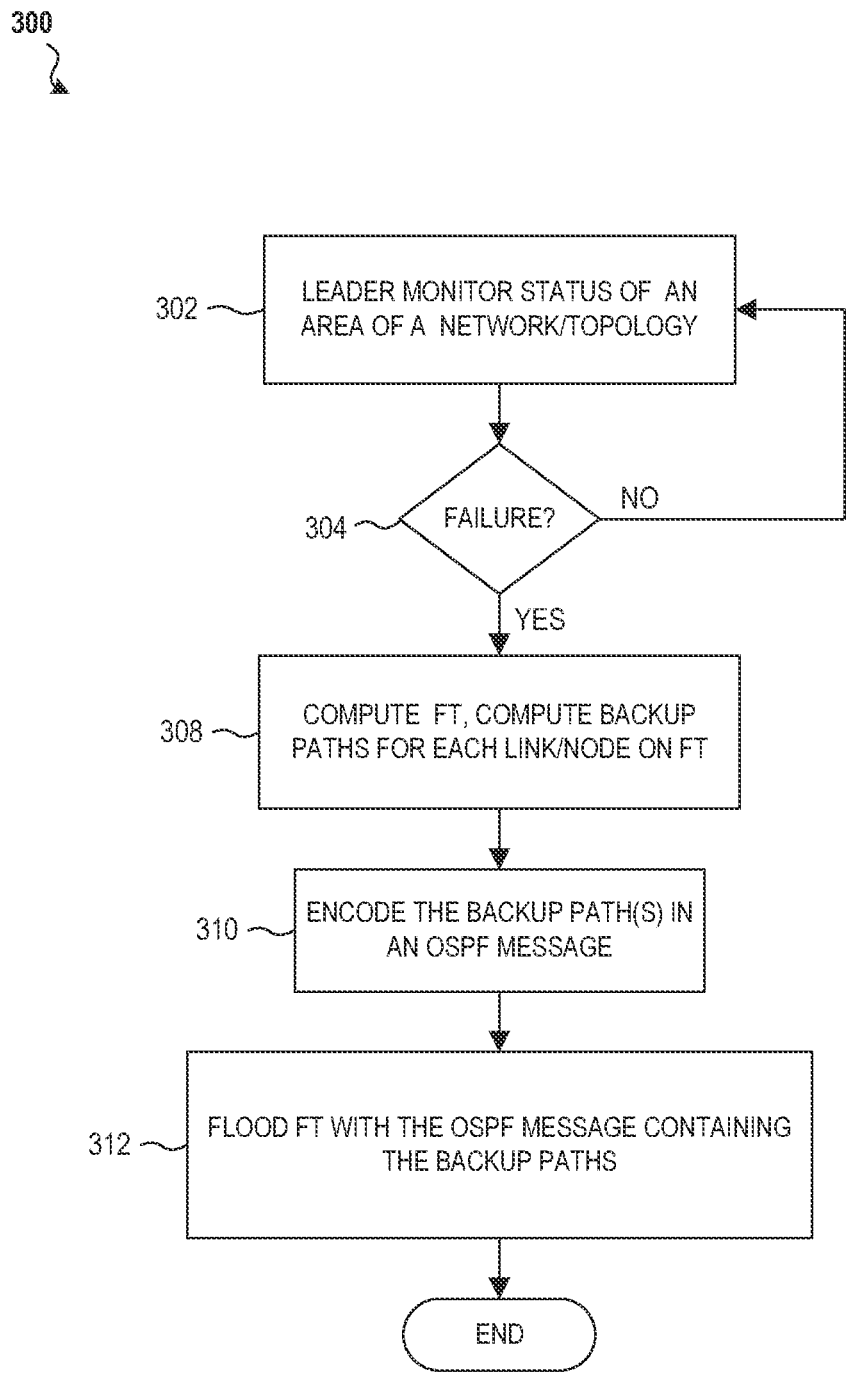
FIG. 3 is a flowchart illustrating a process for encoding messages of a flooding topology and backup paths of the flooding topology in accordance with an embodiment of the present disclosure.

FIG. 3 is a flowchart illustrating a process 300 for encoding messages of a flooding topology and backup paths of the flooding topology in accordance with an embodiment of the present disclosure. In an embodiment, the process 300 is performed by a leader of an area that computes a flooding topology and backup paths for each link/node on the flooding topology. The process 300 begins at step 302 with the leader performing monitoring functions to determine the status or health of the links and/or nodes in an area of a network/topology and to detect a network failure. A network failure is a failure of one or more links, nodes, or both in the network. In one embodiment, the leader determines that a link failed in the network after it receives a new link state, such as a new OSPF router LSA originated by a node, and detects that the link is not in the new link state, but in the old/current link state originated by the node. The leader determines that a node failed in the network after it receives a number of new link states, such as a number of new OSPF router LSAs originated by the nodes around the node, and detects that all the links to the node failed. At step 304, the process 300 determines if a link or node has failed in the area of the network/topology. If there is no link or node failure, the process 300 returns to step 302 and continues to monitor the status of the links and/or nodes in the area of the network/topology.

If the process 300 determines that a link and/or node have failed in the area of the network/topology, the process 300 at step 308 computes a backup path for each of the links/nodes on a flooding topology. In an embodiment, the process 300 may also compute the flooding topology if necessary. In one embodiment, for a link between node A and node B on the flooding topology, a backup path for the link is a unique minimum hop path from node A as source to node B as destination if node A's ID is less than node B's ID. If there are multiple paths from the source to the destination, a unique path is selected from these multiple paths by selecting the path with the link having smaller or smallest remote node ID in the direction from the destination to the source. For a node on the flooding topology, a backup path between each pair of nodes connected to the node via a link on the flooding topology is computed. The backup path is a unique minimum hop path from one end node having a smaller node ID of the pair to the other node having a larger node ID of the pair. At step 310, the process 300 encodes the backup path(s) in an OSPF message. The structures for encoding the data in the OSPF message are described herein. The backup paths can be encoded as separated encoding or as an integrated encoding. In separated encoding, backup paths are encoded in a separated new message, where the message for the flooding topology is required. In integrated encoding, backup paths are integrated into the flooding topology links encoding, where one message contains the flooding topology and the backup paths. At step 312, the process 300 floods the flooding topology with the OSPF message containing the backup path(s), with the process 300 terminating thereafter.

Figure 4A:
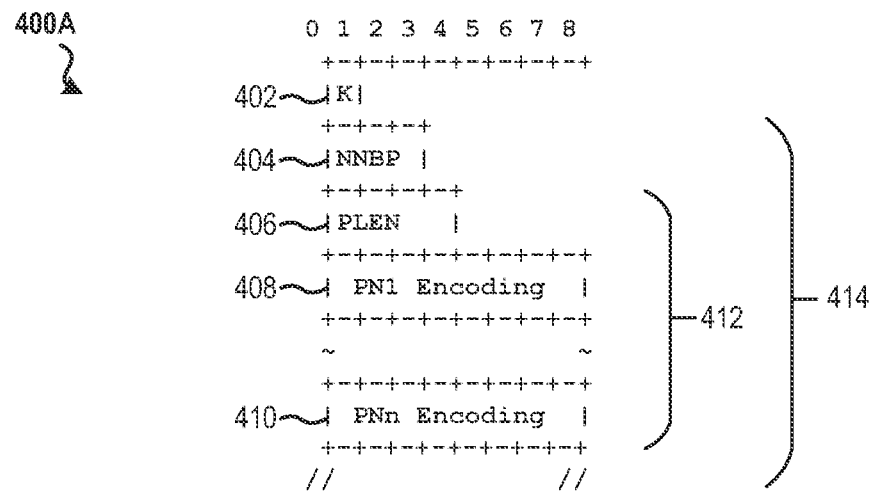
FIG. 4A is a schematic drawing illustrating a node backup path encoding in accordance with an embodiment of the present disclosure.

Regarding the backup paths encoding, FIG. 4A—FIG. 8B describe message encoding data structures for backup paths that are encoded in a separated new message from flooding topology links encoding in a centralized mode where a leader computes the backup paths and floods them to all the other nodes. In particular, FIG. 4A, FIG. 4B, and FIG. 5 illustrate data structures for encoding backup paths for a node. FIG. 6A, FIG. 6B, and FIG. 7 illustrate data structures for encoding backup paths for a link. FIG. 8A and FIG. 8B illustrate modified OSPF data structures for transmitting the encoded node and link backup paths.

FIG. 4A is a schematic drawing illustrating an example of a node backup path data structure 400A in accordance with the present disclosure. The node backup path data structure 400A is a data structure for encoding one or more backup paths for a node. The node backup path data structure 400A includes K flag (Key/Critical node flag) field 402, number of node backup paths (NNBP) field 404, path length (PLEN) field 406, backup path for node one (PN1) encoding field 408, and backup path for node n (PNn) encoding field 410.

In an embodiment, the K flag field 402 is 1 bit and is used to indicate whether the node is a key or critical node. A key or critical node on a flooding topology is a node that is the only node connecting some nodes on the flooding topology. In an embodiment, if the K flag field 402 is set to one (K=1) then the node is critical node, and if the K flag field 402 is set to zero (K=0), then the node is a normal/non-critical node.

In the depicted embodiment, the NNBP field 404 is 3 bits and is used to indicate the number of node backup paths. For instance, one or more backup paths may be created for a node. As an example, generally one backup path is created for a failed link, whereas multiple backup paths may be created for a failed node. Each of the backup paths encoding includes the PLEN field 406 and PN1 encoding field 408 through PNn encoding field 410. The PLEN field 406 is 4 bits and is used to indicate the length of the backup path (i.e., the number of nodes (n) in the backup path). The encoding of the sequence of nodes along the backup path (i.e., path node one (PN1) through path node N (PNn)) are inserted in PN1 encoding field 408 through PNn encoding field 410. In an embodiment, the encoding of each node (PN1, PNn) in the backup path uses the encoding of a local node, which comprises an encoded node index size indication (ENSI) and a compact node index (CNI). The ENSI indicates the size number of bits of the node index (e.g., 9 bits). The CNI specifies the node index. The node index identifies the node in the flooding topology.

As used herein, the "// //" portion of the data structures illustrated in the drawings represents the additional encoding for each additional backup path for the node or link. For instance, the "// //" portion of the data encoding of the node backup path data structure 400A represents the additional encoding for each additional backup path for the node, where each additional backup path includes its encoding for the PLEN field 406 and the PN1 encoding field 408 through PNn encoding field 410. Thus, the encoding encompassed by bracket 412 provides one backup path for the node, and the encoding encompassed by bracket 414 provides all the backup paths for the node.

Figure 4B:
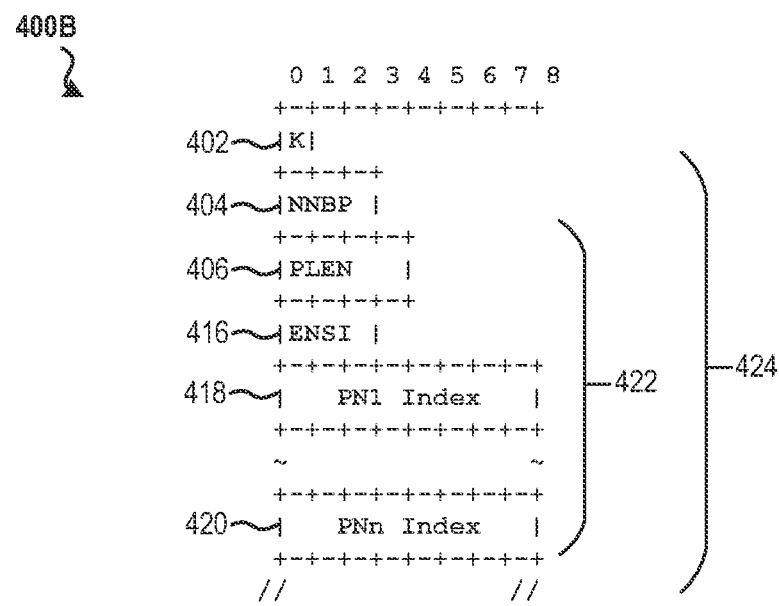
FIG. 4B is a schematic drawing illustrating a node backup path encoding in accordance with another embodiment of the present disclosure.

FIG. 4B is a schematic drawing illustrating a node backup path data structure 400B in accordance with another embodiment of the present disclosure. In an embodiment, the node backup path data structure 400B can be used to encode a sequence of nodes along a backup path that uses one ENSI for all the nodes in the backup path. The node backup path data structure 400B includes the K flag field 402, the NNBP field 404, and the PLEN field 406 as described in the node backup path data structure 400A of FIG. 4A. However, in contrast to the node backup path data structure 400A where the ENSI for each node is specified separately in the individual node encoding in PN1 encoding field 408 through PNn encoding field 410, the ENSI can be specified just once in an ENSI field 416 in the node backup path data structure 400B because the same ENSI is used for all the nodes in the backup path. In an embodiment, the ENSI field 416 is 3 bits. Thus, only the CNI for each node (PN1, PNn) along the backup path are required to be specified respectively in PN1 Index field 418 through PNn Index field 420. Thus, the encoding encompassed by bracket 422 provides one backup path for the node, and the encoding encompassed by bracket 424 provides all the backup paths for the node.

FIG. 5 is a schematic drawing illustrating a node backup paths (NBP) type-length-value (TLV) data structure 500 in accordance with an embodiment of the present disclosure. The NBP TLV data structure 500 is used to encode one or more nodes and their respective backup path(s). The NBP TLV data structure 500 includes a NBP-TLV-Type field 502 that contains a type value that is used to identify the type of data being processed (i.e., a NBP-TLV data structure). The type value for the NBP-TLV data structure 500 is to be determined. The NBP TLV data structure 500 also includes a TLV-Length field 504 that specifies the length or size of the NBP TLV data structure 500 except for NBP-TLV-Type field 502 and TLV-Length field 504. The length or size will vary depending on the number of nodes and backup paths contained in the NBP TLV data structure 500.

Each node is represented by its index encoding, which is followed by its node backup paths encoding. For instance, Node1 index encoding field 506 contains the index encoding for a first node. The Node1 backup paths encoding field 510 contains the backup paths encoding for the first node. For example, the backup paths encoding for the first node may be specified using the node backup path data structure 400A of FIG. 4A, or the node backup path data structure 400B of FIG. 4B. Similarly, Node2 index encoding field 512 contains the index encoding for a second node. The Node2 backup paths encoding field 516 contains the backup paths encoding for the second node. The NBP TLV data structure 500 may include additional nodes and their respective backup path(s).

Figure 6A:
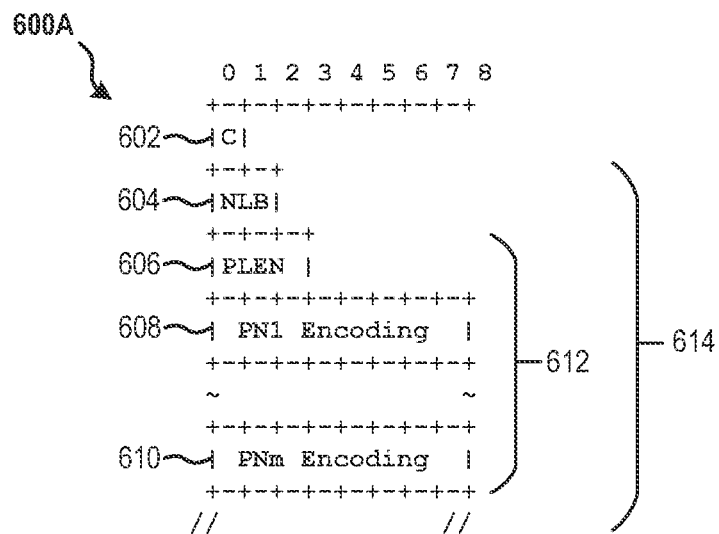
FIG. 6A is a schematic drawing illustrating a link backup paths encoding in accordance with an embodiment of the present disclosure.

FIG. 6A is a schematic drawing illustrating a link backup paths data structure 600A in accordance with an embodiment of the present disclosure. The link backup paths data structure 600A is a data structure for encoding one or more backup paths for a link on a flooding topology. The link backup paths data structure 600A includes C flag (Key/Critical link flag) field 602, number of link backup paths (NLB) field 604, PLEN field 606, PN1 encoding field 608, and PNm encoding field 610.

In an embodiment, the C flag field 602 is 1 bit and is used to indicate whether the node is a key or critical link. A critical link or interface on a flooding topology is a link that is the only link or interface among some nodes on the flooding topology. When a critical link goes down, the flooding topology will be split. In an embodiment, if the C flag field 602 is set to one (C=1) then the link is critical link, and if the C flag field 602 is set to zero (C=0), then the link is a non-critical link.

In an embodiment, the NLB field 604 is 2 bits and is used to indicate the number of link backup paths. The PLEN field 606 indicates a length of a backup path (i.e., the number of nodes in the backup path). In an embodiment, the PLEN field 606 is 3 bits. PN1 encoding field 608 and PNm encoding field 610 have variable bits. The sequence of nodes along the backup path is then encoded in PN1 encoding field 608 through PNm encoding field 610. Thus, for this backup path, the PLEN field 606 will indicate a backup path length of m to indicate that there is m number of nodes in the backup path. In an embodiment, the encoding of each node (PN1, . . . , PNm) uses the encoding of a local node, which comprises an ENSI and a CNI. Thus, the encoding encompassed by bracket 612 provides one backup path for the link, and the encoding encompassed by bracket 614 provides all the backup paths for the link.

Figure 6B:
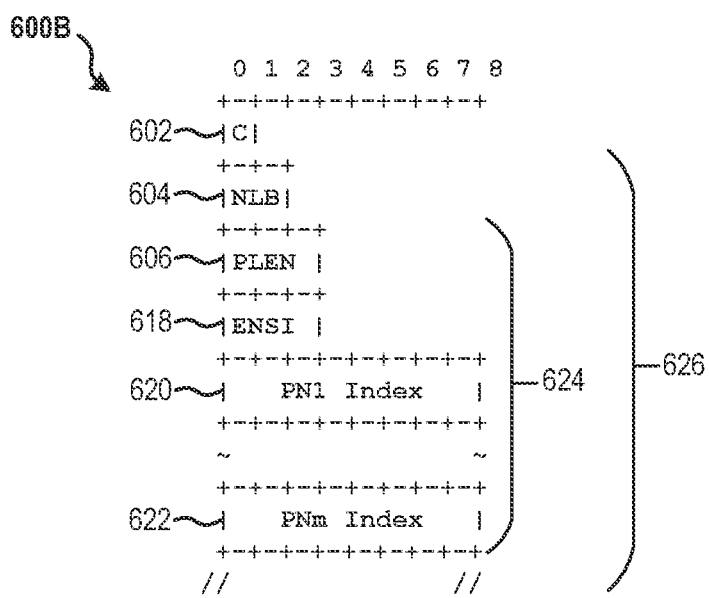
FIG. 6B is a schematic drawing illustrating a link backup paths encoding in accordance with another embodiment of the present disclosure.

FIG. 6B is a schematic drawing illustrating a link backup path data structure 600B in accordance with another embodiment of the present disclosure. The link backup path data structure 600B is a data structure for encoding one or more backup paths for a link on a flooding topology when all the nodes along a backup path use one ENSI. The link backup path data structure 600B includes the C flag field 602, the NLB field 604, and the PLEN field 606 as described in the link backup paths data structure 600A of FIG. 6A. In contrast to the link backup paths data structure 600A where the ENSI for each node is specified separately in the individual node encoding in PN1 encoding field 608 through PNm encoding field 610, the ENSI can be specified just once in an ENSI field 618 in the link backup path data structure 600B because the same ENSI is used for all the nodes in the backup path. In an embodiment, the ENSI field 618 is 3 bits. Thus, only the CNI for each node (PN1, PNm) along the backup path are required to be specified respectively in PN1 Index field 620 through PNm Index field 622. Thus, the encoding encompassed by bracket 624 provides one backup path for the link, and the encoding encompassed by bracket 626 provides all the backup paths for the link.

FIG. 7 is a schematic drawing illustrating a LBP TLV data structure 700 in accordance with an embodiment of the present disclosure. The LBP TLV data structure 700 is used to encode one or more links and their respective backup path(s). The LBP TLV data structure 700 includes a LBP-TLV-Type field 702 that contains a type value that is used to identify the type of data being processed (i.e., a LBP-TLV data structure). The type value for the LBP-TLV data structure 700 is to be determined. The LBP TLV data structure 700 also includes a TLV-Length field 704 that specifies the length or size of the LBP TLV data structure 700 except for LBP-TLV-Type field 702 and TLV-Length field 704. The length or size will vary depending on the number of links and backup paths contained in the LBP TLV data structure 700.

Each link is represented by its index encoding, which is followed by its link backup paths encoding. For instance, Link1 index encoding field 706 contains the index encoding for a first link. The Link1 backup paths encoding field 710 contains the backup paths encoding for Link1. In an embodiment, the backup paths encoding for the Link1 may be specified using the link backup paths data structure 600A of FIG. 6A, or the link backup path data structure 600B of FIG. 6B. Similarly, Link2 index encoding field 712 contains the index encoding for a second link. The Link2 backup paths encoding field 716 contains the backup paths encoding for Link2. The LBP TLV data structure 700 may include additional links and their respective backup path(s).

FIG. 8A is a schematic drawing illustrating a backup paths opaque LSA data structure 800A for open shortest path first version 2 (OSPFv2) in accordance with an embodiment of the present disclosure. In an embodiment, the backup paths opaque LSA data structure 800A is used to flood the backup paths from the leader of an area to all the other nodes in the area. Standard link-state database flooding mechanisms are used for distribution of the backup paths opaque LSA data structure 800A.

The backup paths opaque LSA data structure 800A starts with the standard LSA header, which includes LS age field 802, options field 804, LS type field 806, backup path (BP) type field 808, instance identifier (ID) field 810, advertising router field 812, LS sequence number field 814, LS checksum field 816, and length field 818. A new link and node backup paths TLVs field 820 is appended to the standard LSA header in accordance with an embodiment.

The LS age field 802 is the age of the LSA in seconds. The LS age field 802 is set to 0 when the LSA is originated. The LS age field 802 is incremented on every hop of the flooding procedure. The LS age field 802 can be examined when a router receives two instances of an LSA, both having identical LS sequence numbers and LS checksums.

The options field 804 indicates which optional capabilities are associated with the LSA. OSPF's optional capabilities include, but are not limited to, external routing capability and type of service (ToS) routing capability.

The LS type field 806 dictates the format and function of the LSA (e.g., router-LSAs or network-LSAs). For instance, the range of topological distribution (i.e., the flooding scope) of the backup paths opaque LSA data structure 800A is identified by its link-state type in LS type field 806. In one embodiment, the LS type field 806 is set to Link-state type 10 (as shown in FIG. 8A), which denotes an area-local scope meaning type-10 opaque LSAs are not flooded beyond the borders of their associated area. The LS type field 806 can be set to other opaque LSAs types including type link-state type 9 denoting a link-local scope and link-state type 11 denoting that the LSA is flooded throughout an autonomous system (AS).

The BP type field 808 specifies a new opaque LSA type (to be determined (TBD)) for OSPFv2. This new type will indicate that the opaque LSA contains the node backup paths TLVs and link backup paths TLVs as described herein.

The instance ID field 810 enables multiple opaque LSA instances to be originated by a router. A different instance ID can be used to identify a different opaque LSA.

The advertising router field 812 specifies the OSPF router ID of the LSA's originator. For example, network-LSAs are originated by the network's designated router, summary-LSAs are originated by area border routers, and AS-external-LSAs are originated by AS boundary routers.

The LS sequence number field 814 is a signed 32-bit integer and is used to detect old and duplicate LSAs. The space of sequence numbers is linearly ordered. The larger the sequence number (when compared as signed 32-bit integers) the more recent the LSA. A router uses the smallest sequence number the first time it originates any LSA. Afterwards, the LSA's sequence number is incremented each time the router originates a new instance of the LSA.

The LS checksum field 816 contains the checksum of the complete contents of the LSA, except the LS age field 802. The LS age field 802 is excepted so that an LSA's age can be incremented without updating the checksum. The checksum is used to detect data corruption of an LSA.

The length field 818 contains the length of the LSA in bytes; subtracting the size of the LS age field (two bytes) yields the amount of data to checksum. Additional information regarding the standard LSA header fields and rules that apply to the flooding scope can be found in request for comments (RFC) 2370, RFC 2328, RFC 2740, RFC 3630, and draft-cc-ospf-flooding-reduction-04, which are hereby incorporated by reference in their entireties.

As stated above, backup paths opaque LSA data structure 800A includes a new link and node backup paths TLVs field 820 that is appended to the standard LSA header. The link and node backup paths TLVs field 820 is used to store the node backup paths TLVs and link backup paths TLVs. An example of the encoding for the node backup paths TLVs is NBP TLV data structure 500 of FIG. 5. An example of the encoding for the link backup paths TLVs is LBP TLV data structure 700 of FIG. 7.

FIG. 8B is a schematic drawing illustrating a backup paths opaque LSA data structure 800B for OSPFv3 in accordance with another embodiment of the present disclosure. The backup paths opaque LSA data structure 800B includes a standard LSA header defined for OSPFv3. The standard LSA header defined for OSPFv3 includes the same LS age field 802, the advertising router field 812, the LS sequence number field 814, the LS checksum field 816, and the length field 818 as contained in the standard LSA header defined for OSPFv2 described in FIG. 8A. For OSPFv3, an unsynchronized bit (U-bit) field 822 is set to 1, and a scope field 823 is set to 01 for area-scoping. A BP-LSA field 824 specifies a new LSA type (TBD) that defines this type of LSA. A Link State ID field 826 identifies the piece of the routing domain that is being described by the LSA. For instance, the Link State ID field 826 may contain the originating router's Router ID, the IP interface address of a designated router that originates a network-LSA on behalf of the network, the destination network's IP address, the Router ID of a AS boundary router, or the destination network's IP address.

In addition to the standard LSA header defined for OSPFv3, the backup paths opaque LSA data structure 800B includes the new link and node backup paths TLVs field 820 for storing the node backup paths TLVs and link backup paths TLVs. The leader of an area uses the backup paths opaque LSA data structure 800B to flood the backup paths to all the other nodes in the area.

Figure 9:
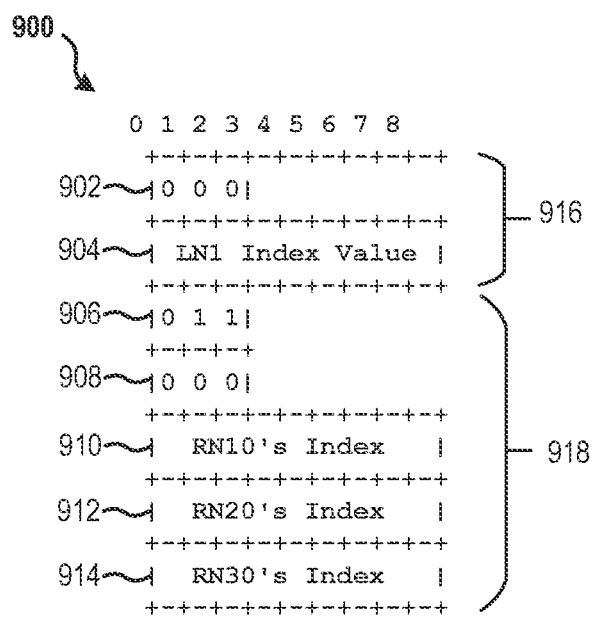
FIG. 9 is a schematic drawing illustrating a links encoding in accordance with an embodiment of the present disclosure.

FIG. 9 is a schematic drawing illustrating a links encoding data structure 900 for a backup path in accordance with an embodiment of the present disclosure. The links encoding data structure 900 specifies a local node (e.g., LN1) and the links between the local node and a number of remote nodes. For example, in the depicted embodiment, three links between local node LN1 and three remote nodes RN10, RN20, and R30 are encoded using the links encoding data structure 900. The links encoding data structure 900 includes a local node ENSI field 902, a local node CNI field 904, a number of remote node (NN) field 906, a remote node ENSI field 908, a first remote node CNI field 910, a second remote node CNI field 912, and a third remote node CNI field 914.

In an embodiment, the local node ENSI field 902 is 3 bits, the local node CNI field 904 is 9 bits, the remote node NN field 906 is 3 bits, the remote node ENSI field 908 is 3 bits, the first remote node CNI field 910 is 9 bits, the second remote node CNI field 912 is 9 bits, and the third remote node CNI field 914 is 9 bits. Thus, in this embodiment, the links encoding data structure 900 comprises 45 bits (i.e., 5.625 bytes).

The local node ENSI field 902 is used to encode the ENSI of the local node LN1. In this example, the local node ENSI indicates that the size of local node LN1 index is the value of ENSI (0) plus 9 bits, which is 9 bits. The local node CNI field 904 specifies the node index value of the local node LN1. The NN field 906 specifies the number of remote nodes that are linked to the local node LN1. In this example, the NN field 906 has a value of 011 in binary, which equate to a value of 3 in decimal to indicate that there are 3 remote nodes (RN10, RN20, and RN30). The remote node ENSI field 908 indicates the size of the remote node index. In this example, the remote node ENSI indicates that the size of remote node RN10, RN20, and RN30 index is the value of the ENSI (0) plus 9 bits, which is 9 bits. In the depicted embodiment, the first remote node CNI field 910 specifies the node index (CNI) of the remote node 10 (RN10), the second remote node CNI field 912 specifies the node index of the remote node 20 (RN20), and the third remote node CNI field 914 specifies the node index of the remote node 30 (RN30). Thus, the links encoding data structure 900 represents the three links between the local node (LN1) and the 3 remote notes (RN10, RN20, and RN30).

FIG. 10 is a schematic drawing illustrating a FTLK TLV data structure 1000 in accordance with an embodiment of the present disclosure. The FTLK TLV data structure 1000 can be used to represent all the links on a flooding topology computed by a leader of an area. The FTLK TLV data structure 1000 includes a FTLK-TLV-Type field 1002 that specifies a type code or value (TBD) that identifies the data structure as a FTLK TLV. A TLV-Length field 1004 specifies the length or size of the FTLK TLV data structure 1000 except for FTLK-TLV-Type field 1002 and TLV-Length field 1004. The FTLK TLV data structure 1000 includes a plurality of links encoding fields such as, but not limited to, links encoding field 1006, links encoding field 1008, and links encoding field 1010. Each links encoding field contains the links encoding from a local node to one or more remote nodes. For example, links encoding field 1006 can store the links encoding from Node 1 to its remote nodes, links encoding field 1008 can store the links encoding from Node 2 to its remote nodes, and links encoding field 1010 can store the links encoding from Node N to its remote nodes. Links encoding data structure 900 as described in FIG. 9 is an example data structure that can be used to encode the links encoding from a local node to its remote nodes.

FIG. 11A is a schematic drawing illustrating a flooding topology opaque LSA data structure 1100A for OSPFv2 in accordance with an embodiment of the present disclosure. The flooding topology opaque LSA data structure 1100A includes one or more flooding topology links TLV as described in FIG. 9. For OSPFv2, a leader of an area can create a message containing the flooding topology opaque LSA data structure 1100A to flood the flooding topology to all the other nodes in the area.

The flooding topology opaque LSA data structure 1100A includes LS age field 1102, options field 1104, LS type field 1106, flooding topology (FT) type field 1108, instance ID field 1110, advertising router field 1112, LS sequence number field 1114, LS checksum field 1116, length field 1118, and flooding topology links TLV field 1120. The LS age field 1102, options field 1104, LS type field 1106, instance ID field 1110, advertising router field 1112, LS sequence number field 1114, LS checksum field 1116, and length field 1118 are part of the standard LSA header for OSPFv2 as described in FIG. 8A. The FT type field 1108 specifies a new opaque LSA type (TBD) that indicates that the data structure is an opaque LSA containing a flooding topology links TLV stored in the flooding topology links TLV field 1120. An example of the encoding for the flooding topology links TLV is FTLK TLV data structure 1000 of FIG. 10.

FIG. 11B is a schematic drawing illustrating a flooding topology opaque LSA encoding 1100B for OSPFv3 in accordance with an embodiment of the present disclosure. The flooding topology opaque LSA encoding 1100B includes a standard LSA header defined for OSPFv3 that includes the LS age field 1102, the advertising router field 1112, the LS sequence number field 1114, the LS checksum field 1116, and the length field 1118 as contained in the standard LSA header defined for OSPFv2 described in FIG. 11A. For OSPFv3, an unsynchronized bit (U-bit) field 1122 is set to 1, and a scope field 1123 is set to 01 for area-scoping. A FT-LSA field 1124 specifies a new LSA type (TBD) that defines this type of LSA. A Link State ID field 1126 identifies the piece of the routing domain that is being described by the LSA as described in FIG. 8B. In addition to the standard LSA header defined for OSPFv3, the flooding topology opaque LSA encoding 1100B includes the new flooding topology links TLV field 1120 for storing the flooding topology links TLV (e.g., FTLK TLV data structure 1000 of FIG. 10). The leader of an area uses the flooding topology opaque LSA encoding 1100B to flood the flooding topology to all the other nodes in the area.

The above embodiments describe separate message encodings for encoding backup paths messages (FIG. 4A-FIG. 8B) and for encoding flooding topology links messages (FIG. 9-FIG. 11B). In certain embodiments, the backup paths can be integrated into the flooding topology links encoding to generate a single integrated message containing the flooding topology and the backup paths.

Figure 12A:
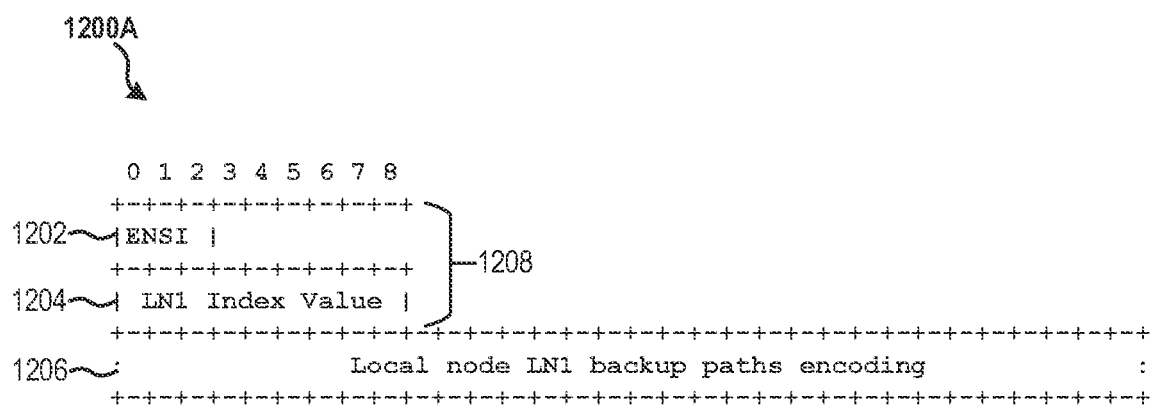
FIG. 12A is a schematic drawing illustrating a local node with backup paths encoding in accordance with an embodiment of the present disclosure.

As an example, FIG. 12A is a schematic drawing illustrating a local node with backup paths data structure 1200A in accordance with an embodiment of the present disclosure. The local node with backup paths data structure 1200A can be used to encode a local node and its backup paths. For instance, a local node LN1 can be encoded by encoding its ENSI in ENSI field 1202 and its node index value in LN1 index value field 1204. In an embodiment, the ENSI field 1202 is 3 bits and the number of bits for the LN1 index value field 1204 is indicated by the ENSI of the node. The backup paths encoding for the local node LN1 is encoded in a Local node LN1 backup paths encoding field 1206. As an example, the backup paths encoding for the local node LN1 can be encoded using the node backup path data structure 400A illustrated in FIG. 4A or the node backup path data structure 400B illustrated in FIG. 4B.

Figure 12B:
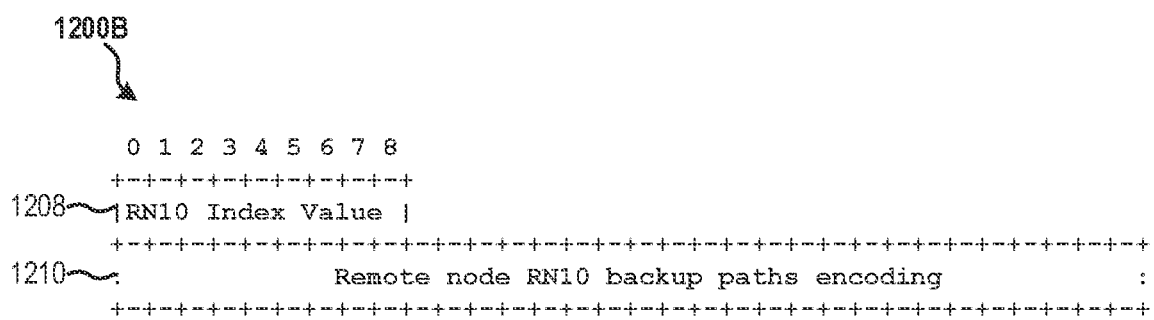
FIG. 12B is a schematic drawing illustrating a remote node with backup paths encoding in accordance with an embodiment of the present disclosure.

FIG. 12B is a schematic drawing illustrating a remote node with backup paths data structure 1200B in accordance with an embodiment of the present disclosure. For instance, the remote node RN10 with backup paths data structure 1200B can be used to encode a remote node RN10 and its backup paths. The remote node with backup paths data structure 1200B encodes the node index value of RN10 in a RN10 index value field 1208 (#bits indicated by ENSI). The backup paths encoding for the remote node RN10 is encoded in a remote node RN10 backup paths encoding field 1210 (e.g., using the data structures in FIG. 4A or FIG. 4B).

FIG. 13 is a schematic drawing illustrating a links from node with backup paths data structure 1300 in accordance with an embodiment of the present disclosure. The links from node with backup paths data structure 1300 specifies the links between a local node and a number of remote nodes, the backup paths for each of the nodes, and the backup paths for each of the links can be encoded in the following format. The links from node with backup paths data structure 1300 includes local node with backup paths encoding field 1302, NN field 1304, ENSI field 1306, remote node RN1 with backup paths encoding field 1308, link1 backup paths encoding field 1310, remote node RN2 with backup paths encoding field 1312, and link2 backup paths encoding field 1314.

The local node and its backup paths are encoded in a local node with backup paths encoding field 1302 (e.g., using the local node with backup paths data structure 1200A in FIG. 12A). The number of remote nodes is encoded in an NN field 1304. The number of remote nodes will indicate the number of links. The remote node index size indication is specified in the ENSI field 1306. A first remote node RN1 with backup paths encoding are encoded in the remote node RN1 with backup paths encoding field 1308 (e.g., using the remote node with backup paths data structure 1200B in FIG. 12B). The link between the local node and the remote node RN1, and the backup paths for the link, are encoded in link1 backup paths encoding field 1310 (e.g., using link backup paths data structure 600A in FIG. 6A or link backup path data structure 600B in FIG. 6B). Similarly, a second remote node RN2 with backup paths encoding are encoded in the remote node RN2 with backup paths encoding field 1312. The link between the local node and the remote node RN2, and the backup paths for the link, are encoded in link2 backup paths encoding field 1314. The links from node with backup paths data structure 1300 can include additional fields for each additional remote node/link.

Figure 14:
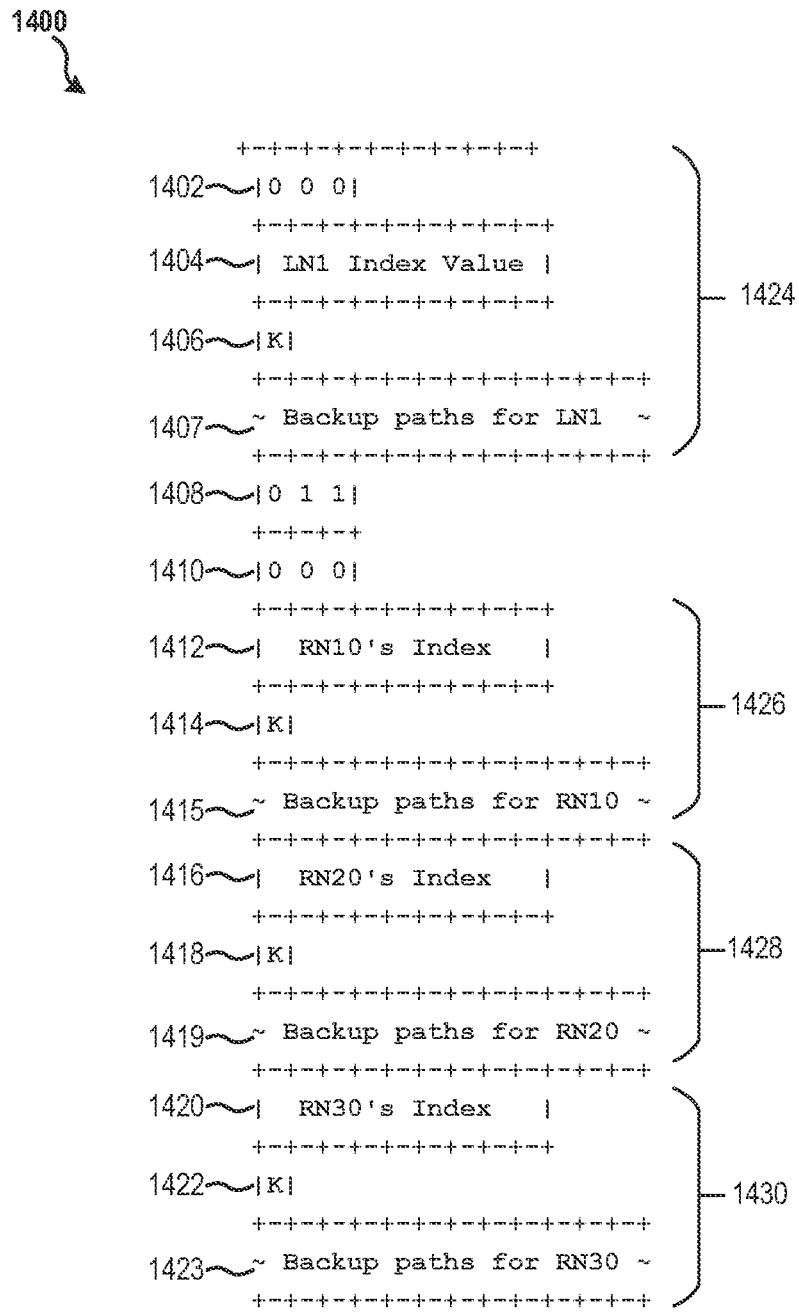
FIG. 14 is a schematic drawing illustrating a links from node with node backup paths encoding in accordance with an embodiment of the present disclosure.

As an example, FIG. 14 is a schematic drawing illustrating a links from a node with node backup paths data structure 1400 in accordance with an embodiment of the present disclosure. The links from a node with node backup paths data structure 1400 represents three links between local node LN1 and three remote nodes RN10, RN20, and RN30; backup paths for node LN1; backup paths for node RN10; backup paths for node RN20; and backup paths for node RN30. In particular, bracket 1424 represents local node LN1 with backup paths encoding, bracket 1426 represents remote node RN10 with backup paths encoding, bracket 1428 represents remote node RN20 with backup paths encoding, and bracket 1430 represents remote node RN30 with backup paths encoding.

The local node LN1 with backup paths is encoded in an ENSI field 1402, a CNI field 1404, a critical node (K) flag field 1406, and backup paths for LN1 field 1407. In an embodiment, the ENSI field 1402 is 3 bits, which indicates that the CNI field 1404 is 9 bits, and the critical node (K) flag field 1406 is 1 bit. The CNI field 1404 contains the CNI of the local node LN1. The critical node (K) flag field 1406 is used to indicate whether the local node LN1 is a critical node. The backup paths for LN1 field 1407 contains the backup paths for LN1 (e.g., using the data structures in FIG. 4A or FIG. 4B).

ANN field 1408 is used to specify the number of remote nodes in the links from a node with node backup paths data structure 1400. In an embodiment, the NN field 1408 is 3 bits. For example, a value of 011 in the NN field 1408 indicates that the links from a node with node backup paths data structure 1400 contains 3 remote nodes. In an embodiment, an ENSI field 1410 is 3 bits and is used to specify the size of the indexes of the remote nodes. In this example, the value 0 in ENSI field 1410 specifies the size of remote node indexes is 9 bits, which is 0 plus a constant such as 9 in this example.

In an embodiment, a CNI field 1412 is 9 bits and contains the RN10's node index value. A critical node (K) flag field 1414 is 1 bit and indicates whether RN10 is a critical node. The backup paths for RN10 field 1415 contains the backup paths for RN10 (e.g., using the data structures in FIG. 4A or FIG. 4B). Similarly, RN20 with backup paths encoding is encoded in a CNI field 1416, a critical node (K) flag field 1418, and a backup paths for RN20 field 1419. RN30 with backup paths encoding is encoded in a CNI field 1420, a critical node (K) flag field 1422, and a backup paths for RN30 field 1423.

Figure 15:
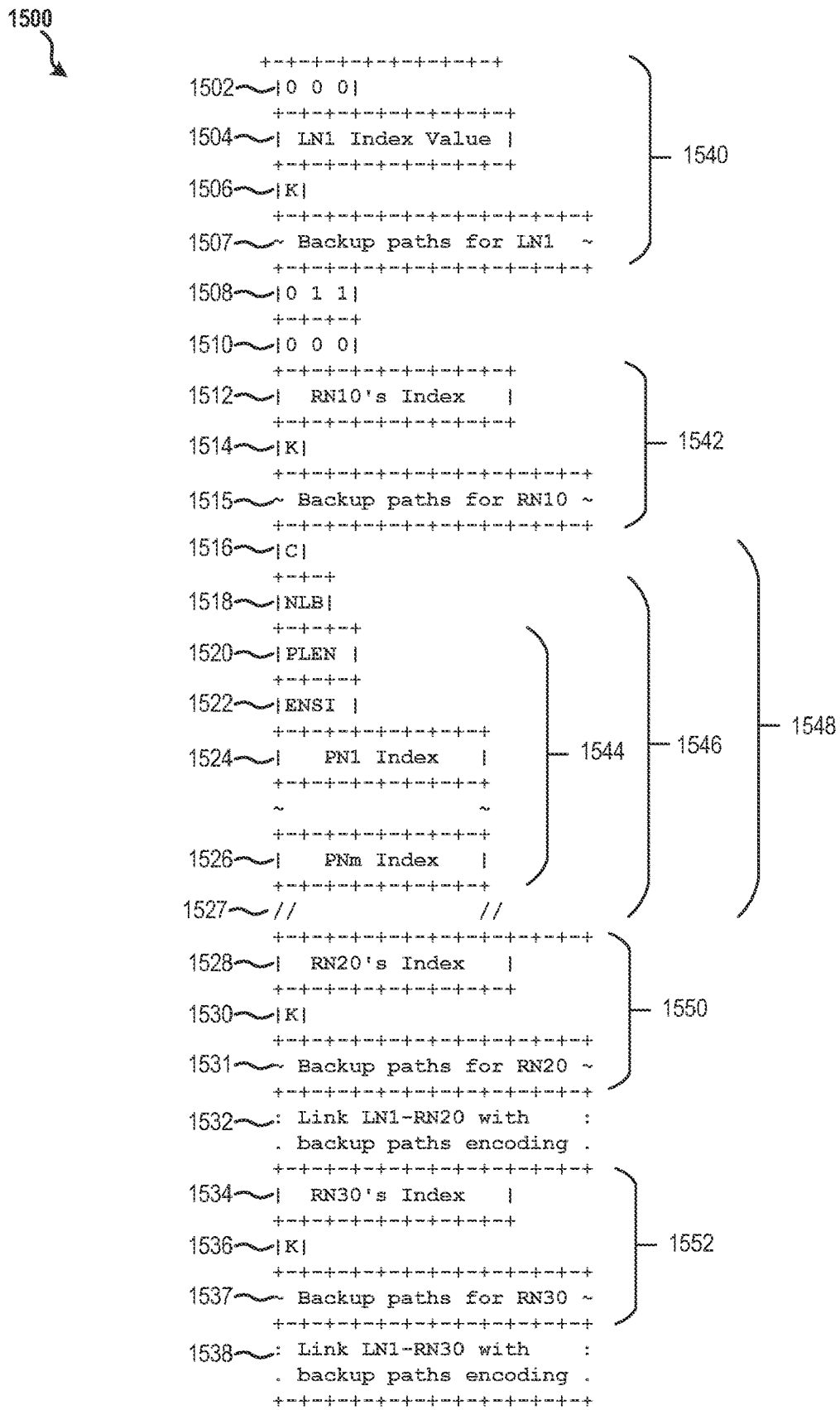
FIG. 15 is a schematic drawing illustrating a links from a node with link and node backup paths encoding in accordance with an embodiment of the present disclosure.

In another embodiment, the link backup paths may also be added. For example, FIG. 15 is a schematic drawing illustrating links from a node with link and node backup paths data structure 1500 in accordance with an embodiment of the present disclosure. In the depicted embodiment, the links from a node with link and node backup paths data structure 1500 represents three links between local node LN1 and three remote nodes RN10, RN20, and RN30; backup paths for local node LN1; backup paths for node RN10; backup paths for node RN20; and backup paths for node RN30; backup paths for the link between local node LN1 and node RN10; backup paths for the link between local node LN1 and node RN20; and backup paths for the link between local node LN1 and node RN30.

Bracket 1540 represents the encoding for the local node LN1 with backup paths. In an embodiment, the local node LN1 is encoded in a 3-bit ENSI field 1502, a 9-bit CNI field 1504, and a 1-bit critical node (K) flag field 1506. The backup paths for the local node LN1 is encoded in backup paths for LN1 field 1507 as described above. A 3-bit NN field 1508 is used to specify the number of remote nodes, and a 3-bit ENSI field 1510 is used to specify the size of indexes of the remote nodes.

Bracket 1542 represents the encoding for the remote node RN10 with backup paths. In an embodiment, RN10 is encoded using a 9-bit CNI field 1512 and a 1-bit critical node (K) flag field 1514. The backup paths for RN10 is encoded in backup paths for RN10 field 1515 as described above.

Bracket 1548 represents the encoding for the link from the local node LN1 to the remote node RN10 with backup paths. For instance, bracket 1546 represents the encoding for all the backup paths for the link from the local node LN1 to the remote node RN10, while bracket 1544 represents the encoding for just one backup path for the link from the local node LN1 to the remote node RN10. The encoding for the link from the local node LN1 to the remote node RN10 with backup paths includes a 1-bit critical link (C) flag field 1516 to indicate whether the link is a critical link. A 2-bit NLB field 1518 indicates the number of link backup paths. A backup path for the link is encoded using a 3-bit PLEN field 1520 to indicate the backup path length, a 3-bit ENSI field 1522 for the number of bits indication for node indexes. The node index for the node PN1 through node PNm in the backup path for the link is specified in PN1 index field 1524 through PNm index field 1526. The number of bits for each of the PN1 index field 1524 through PNm index field 1526 is specified in the 3-bit ENSI field 1522. Additional backup paths for the link are included in the "// //" portion 1527 of the links from a node with link and node backup paths data structure 1500.

The above encoding is repeated for RN20 and RN30. For instance, bracket 1550 represents the encoding for RN20 with backup paths encoding, and bracket 1552 represents the encoding for RN30 with backup paths encoding. RN20 with backup paths encoding using a 9-bit CNI field 1528, a 1-bit critical node (K) flag field 1530, and the backup paths for RN20 is encoded in backup paths for RN20 field 1531. The link from the local node LN1 to the remote node RN20 with backup paths is encoded in field 1532 using the same data fields described above and represented by bracket 1548.

Similarly, RN30 with backup paths encoding using a 9-bit CNI field 1534, a 1-bit critical node (K) flag field 1536, and the backup paths for RN30 is encoded in backup paths for RN30 field 1537. The link from the local node LN1 to the remote node RN30 with backup paths is encoded in field 1538 using the same data fields described above and represented by bracket 1548.

FIG. 16 is a schematic drawing illustrating a LNSBP TLV data structure 1600 in accordance with an embodiment of the present disclosure. The LNSBP TLV data structure 1600 contains both the flooding topology and the backup paths for the links and nodes on the flooding topology. The LNSBP TLV data structure 1600 includes a LNSBP-TLV-Type field 1602 that specifies a new TLV type called Links with Backup Paths TLV. The type value to specify this type is TBD. A TLV-Length field 1604 specifies the length of the LNSBP TLV data structure 1600 except for LNSBP-TLV-Type field 1602 and TLV-Length field 1604. The links from Node 1 with backup paths field 1606 contains the links from Node 1 with backup paths encoding (e.g., using the links from a node with node backup paths data structure 1400 described in FIG. 14), the links from Node 2 with backup paths field 1608 contains the links from Node 2 with backup paths encoding, and the links from Node N with backup paths field 1612 contains the links from Node N with backup paths encoding. The portion 1610 of the LNSBP TLV data structure 1600 represents the links from Node 3 with backup paths to the links from Node N–1 with backup paths are encoding.

FIG. 17A is a schematic drawing illustrating a FTBP opaque LSA data structure 1700A for OSPFv2 in accordance with an embodiment of the present disclosure. The FTBP opaque LSA data structure 1700A includes LS age field 1702, options field 1704, LS type field 1706, FTBP type field 1708, instance ID field 1710, advertising router field 1712, LS sequence number field 1714, LS checksum field 1716, length field 1718, and links with backup paths TLV field 1720. The LS age field 1702, options field 1704, LS type field 1706, instance ID field 1710, advertising router field 1712, LS sequence number field 1714, LS checksum field 1716, and length field 1718 are part of the standard LSA header for OSPFv2 as described in FIG. 8A. The FTBP type field 1708 specifies a new opaque LSA type (TBD) to identify the data structure as a FTBP opaque LSA that contains a links with backup paths TLV in the links with backup paths TLV field 1720. An example of the encoding for the links with backup paths TLV is LNSBP TLV data structure 1600 of FIG. 16. For OSPFv2, the FTBP opaque LSA data structure 1700A can be used to flood the flooding topology with backup paths from a leader of an area to all the other nodes in the area.

FIG. 17B is a schematic drawing illustrating a FTBP data structure LSA encoding 1700B for OSPFv3 in accordance with an embodiment of the present disclosure. The FTBP data structure LSA encoding 1700B includes a standard LSA header defined for OSPFv3 that includes the LS age field 1702, the advertising router field 1712, the LS sequence number field 1714, the LS checksum field 1716, and the length field 1718 as contained in the standard LSA header defined for OSPFv2 described in FIG. 17A. For OSPFv3, an unsynchronized bit (U-bit) field 1722 is set to 1, and a scope field 1723 is set to 01 for area-scoping. A FTBP-LSA field 1724 specifies a new LSA type (TBD) that defines this type of LSA. A Link State ID field 1726 identifies the piece of the routing domain that is being described by the LSA as described in FIG. 8B. In addition to the standard LSA header defined for OSPFv3, the FTBP data structure LSA encoding 1700B includes the new links with backup paths TLV field 1720 for storing the links with backup paths TLV (e.g., LNSBP TLV data structure 1600 of FIG. 16). In an embodiment, the leader of an area uses the FTBP data structure LSA encoding 1700B to flood the flooding topology to all the other nodes in the area.

Figure 18:
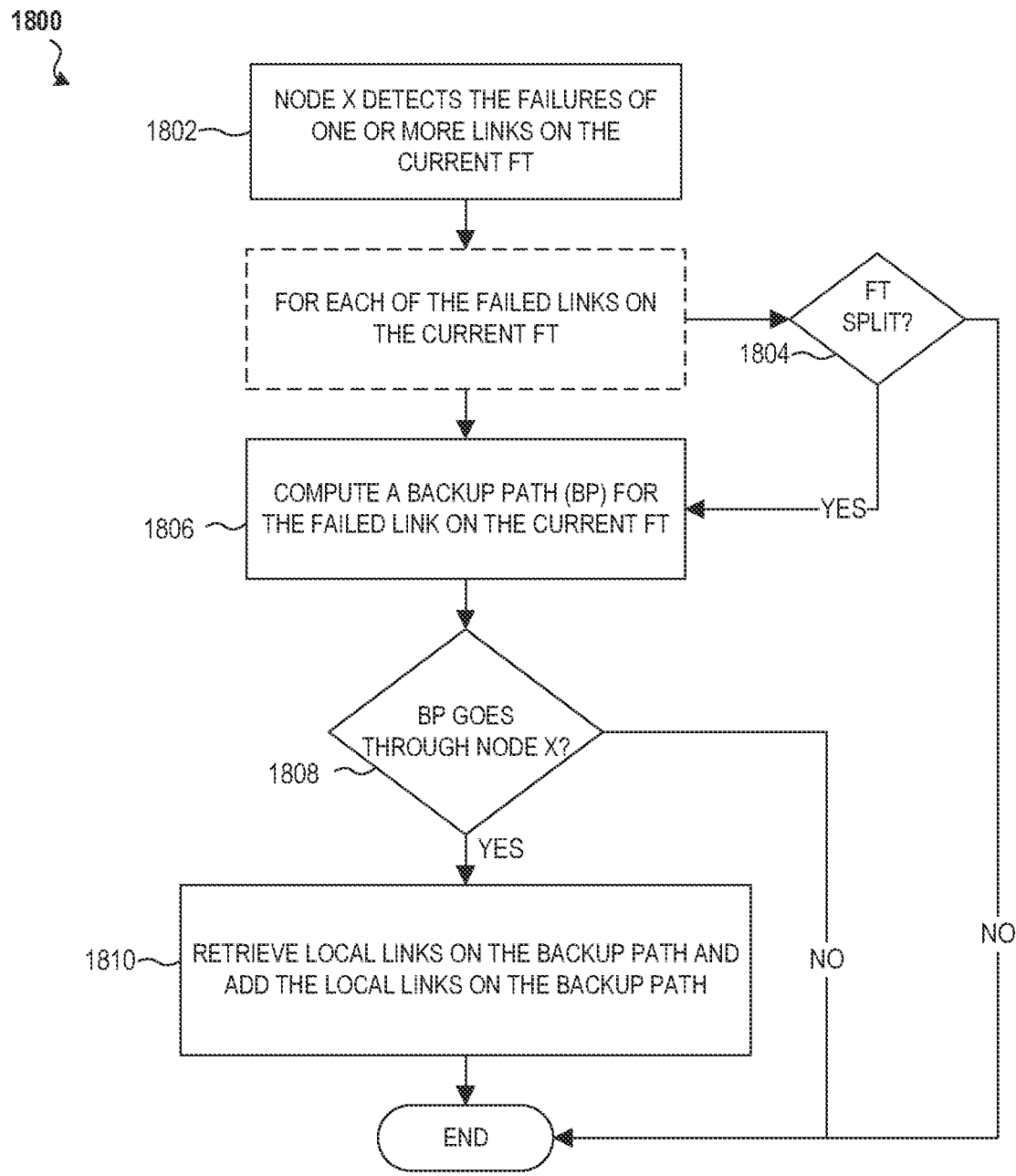
FIG. 18 is a flowchart illustrating a process for computing a backup path in a distributed manner in accordance with an embodiment of the present disclosure.

As described above in FIG. 3, a leader of an area of a flooding topology can be configured to compute a backup path. In alternative embodiments, the backup paths can be computed in distributed way by some or all of the nodes of a flooding topology as opposed to a single leader node. As an example, FIG. 18 is a flowchart illustrating a process 1800 for computing a backup path in a distributed manner in accordance with an embodiment of the present disclosure. The process 1800 can be performed by some or all of the node X in a flooding topology. Node X represents a node that is part of a flooding topology. The process 1800 begins at step 1802 when node X detects the failures of one or more links on the current flooding topology. In an embodiment, for each of the failed links on the current flooding topology, the process 1800, at step 1806, computes a backup path for the failed link. For instance, if node X detects a failure of a link on the current flooding topology between node A and node B, node X computes a backup path between node A and node B, wherein the backup path is a shortest path between node A and node B in term of the number of hops. In an embodiment, when the process 1800 on node X computes a backup path between node A and node B, it may compute the path from node A to node B if node A's ID is less than node B's ID. If every node computes a backup path from node A to node B, a unique backup path is computed by every node. If a first node computes a backup path from node A to node B, and a second node computes a backup path from node B to node A, then the two backup paths may be different. For example, when there are multiple paths between node A and node B, the first node and the second node will obtain the multiple paths first, and then select one path from these multiple paths as a backup path. In one embodiment, a node selects one path from the multiple paths by selecting a path with the link having a smaller or smallest remote node ID along the direction from the destination node to the source node. In an embodiment, in order to ensure that every node computes a backup path between node A and node B from the same source node to the same destination node, the node with the smaller node ID is designated as the source node and the node with larger node ID is designated as the destination node.

At step 1808, the process 1800 determines whether the backup path goes through node X. If the backup path goes through node X, then, the process 1800, at step 1810, retrieves the local links of node X (e.g., link L1 and L2) on the backup path and temporarily adds the local links on the backup path into the current flooding topology until a new flooding topology is built, and then terminates. If, at step 1808, the process 1800 determines that the backup path does not go through node X, the process 1800 on node X does not perform any action and terminates.

In an alternative embodiment, for each of the failed links on the current flooding topology, the process 1800, at step

1804, determines whether the current flooding topology is split by the failed link, and if so, the process 1800 proceeds to step 1806; otherwise, the process 1800 on node X does not perform any action and terminates. This embodiment is slower than the above embodiment (i.e., proceeding directly to step 1806) because it requires that the flooding topology to be traversed to determine whether the current flooding topology is split by the failed link. In an embodiment, when node X is too far away from a failure point (e.g., 5 hops from the failure point), the process 1800 may be configured to take no action.

Figure 19:
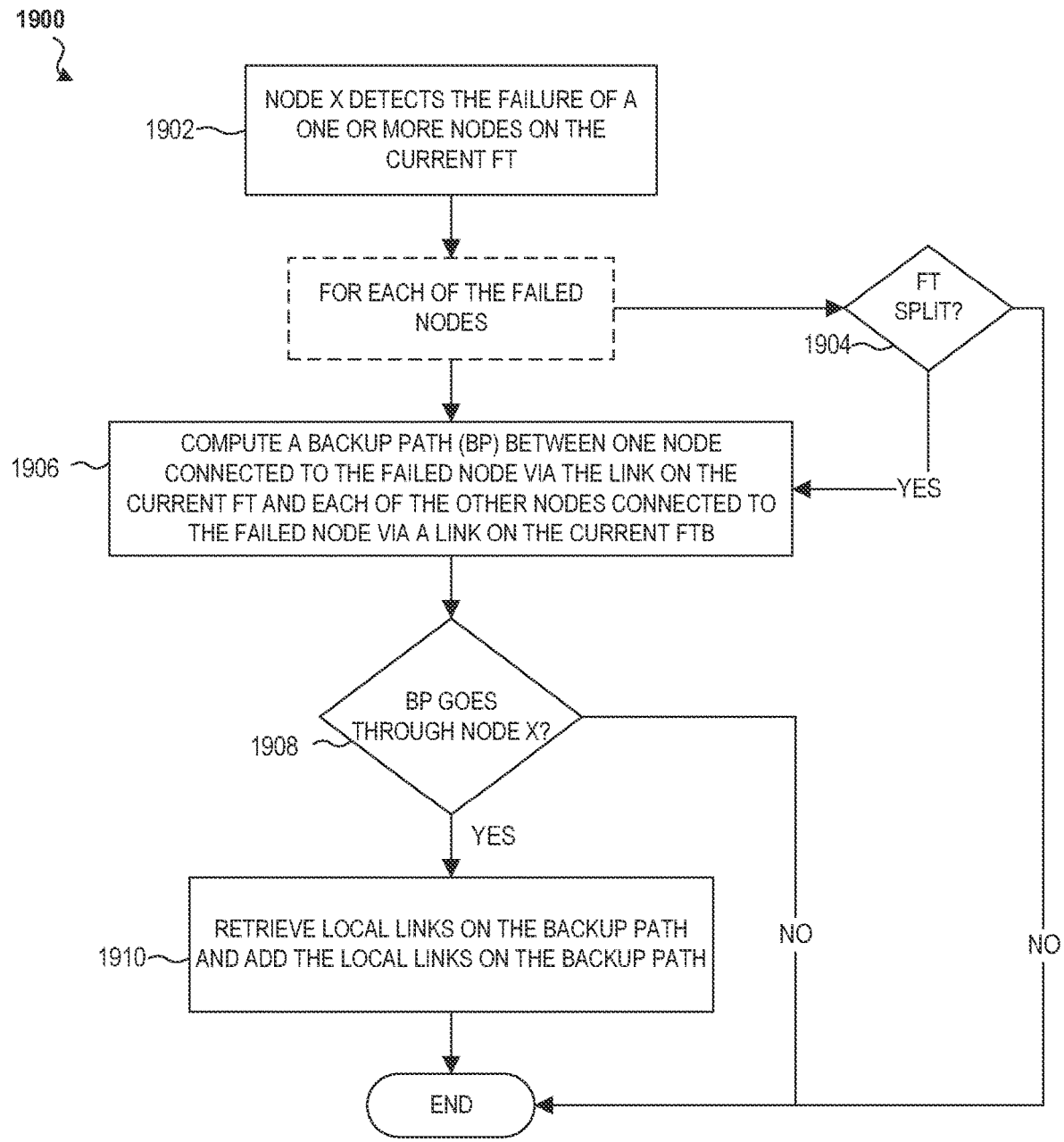
FIG. 19 is a flowchart illustrating a process for computing a backup path in a distributed manner in accordance with an embodiment of the present disclosure.

FIG. 19 is a flowchart illustrating a process 1900 for computing a backup path in a distributed manner in accordance with an embodiment of the present disclosure. The process 1900 can be performed by some or all node X in a flooding topology. The process 1900 begins at step 1902 when node X detects the failures of one or more nodes on the current flooding topology. In an embodiment, for each of the failed nodes on the current flooding topology, the process 1900, at step 1906, computes a backup path between each pair of nodes that are connected to the failed node through a link on the current flooding topology. At step 1908, the process 1900 determines whether the backup path goes through node X. If the backup path goes through node X, then, the process 1900, at step 1910, retrieves the local links of node X (e.g., link L1 and L2) on the backup path and temporarily adds the local links on the backup path into the current flooding topology until a new flooding topology is built (e.g., a new flooding topology is computed by the leader, received and built by node X). In one embodiment, when node X adds each of the links connected to it and on the backup path, it checks whether the link is already on the flooding topology or whether there is a path on the flooding topology from node X to the remote end of the link. If so, node X does not add it to the flooding topology; otherwise, it adds the link to the flooding topology until a new flooding topology is built.

In an alternative embodiment, for each of the failed nodes on the current flooding topology, the process 1900, at step 1904, determines whether the current flooding topology is split by the failed node, and if so, the process 1900 proceeds to step 1906; otherwise, the process 1900 on node X does not perform any action and terminates. This embodiment is slower than the preceding embodiment because it requires that the flooding topology be traversed to determine whether the current flooding topology is split by the failed node. In an embodiment, when node X is too far away from a failure point (e.g., a predetermined hops from the failure point), the process 1900 may be configured to take no action.

Figure 20:
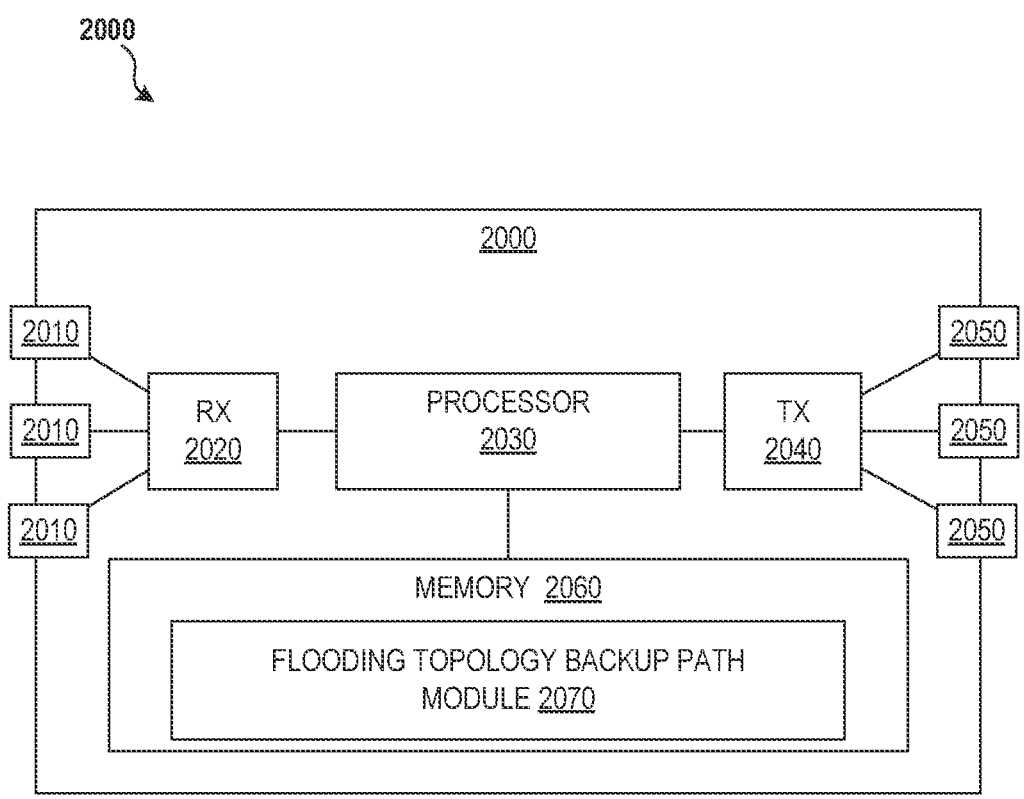
FIG. 20 is a schematic architecture diagram of an apparatus according to an embodiment of the disclosure.

FIG. 20 is a schematic architecture diagram of an apparatus 2000 according to an embodiment of the disclosure. The apparatus 2000 is suitable for implementing the disclosed embodiments as described herein. For example, in an embodiment, a leader node or a Node X on a flooding topology can be implemented using the apparatus 2000. In various embodiments, the apparatus 2000 can be deployed as a router, a switch, and/or a controller within a network.

The apparatus 2000 comprises receiver units (Rx) 2020 or receiving means for receiving data via ingress ports 2010; a processor 2030, logic unit, central processing unit (CPU) or other processing means to process instructions; transmitter units (TX) 2040 or transmitting means for transmitting via data egress ports 2050; and a memory 2060 or data storing means for storing the instructions and various data. The processor 2030 may be implemented as one or more CPU chips, cores (e.g., as a multi-core processor), field-programmable gate arrays (FPGAs), application specific integrated circuits (ASICs), and digital signal processors (DSPs). The processor 2030 is in communication with the ingress ports 2010, RX 2020, TX 2040, egress ports 2050, and memory 2060. The processor 2030 can be configured to execute instructions stored in memory 2060. The memory 2060 can be any type of memory or component capable of storing data and/or instructions. For example, the memory 2060 may be volatile and/or non-volatile memory such as read-only memory (ROM), random access memory (RAM), ternary content-addressable memory (TCAM), and/or static random-access memory (SRAM). The memory 2060 can also include one or more disks, tape drives, and solid-state drives and may be used as an over-flow data storage device, to store programs when such programs are selected for execution, and to store instructions and data that are read during program execution. In some embodiments, the memory 2060 can be memory that is integrated with the processor 2030.

In one embodiment, the memory 2060 stores flooding topology backup path module 2070 that include instructions for implementing the disclosed embodiments. For instance, the flooding topology backup path module 2070 can include instructions for implementing the processes and encoding the backup paths as described herein. The inclusion of the flooding topology backup path module 2070 substantially improves to the functionality of the apparatus 2000 by enabling continuous uninterrupted network services to be provided to customers.

Accordingly, the disclosed embodiments provide various systems and methods for encoding messages of a flooding topology and backup paths of the flooding topology. Some benefits afforded by the embodiments described in this disclosure include providing a standardize protocol for encoding messages of a flooding topology and backup paths of the flooding topology, reducing the amount of LS flooding, and increasing tolerance to multiple network failures. The disclosed embodiments can be deployed in any router and switch and controller, which are used by the service providers globally. In a centralized mode, the leader computes the backup paths and floods them to all the other nodes. In a distributed mode, every node computes the backup paths. The disclosed embodiments compute backup paths for a critical link and node. Moreover, backup paths for every non critical link and node on the flooding topology are also computed. When the failures of multiple links and nodes on the flooding topology happen, through the remaining flooding topology and the backup paths for these links and nodes, an LS can be quickly flooded to every live node in the network. The disclosed embodiments enable continuous service to be provided to customers.

The disclosed embodiments may be a system, an apparatus, a method, and/or a computer program product at any possible technical detail level of integration. The computer program product may include a computer readable storage medium (or media) having computer readable program instructions thereon for causing a processor to carry out aspects of the present disclosure. The computer readable storage medium may be a tangible device that can retain and store instructions for use by an instruction execution device.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method for encoding messages of a flooding topology and backup paths of the flooding topology, comprising:
    detecting a network failure, wherein the network failure is a link failure, a node failure, or both;
    determining the flooding topology following detection of the network failure;
    determining a backup path for each link and node on the flooding topology to generate a plurality of backup paths;
    encoding the backup paths for each link in a link backup path (LBP) data structure or for each node in a node backup path (NBP) data structure;
    encoding the LBP data structure in a LBP type-length-value (TLV) or the NBP data structure in a NBP-TLV;
    encoding the LBP-TLV or the NBP-TLV in a backup paths opaque link state advertisement (LSA); and
    flooding the flooding topology with the backup paths opaque LSA.

2. The method of claim 1, further comprising encoding both the LBP-TLV and the NBP-TLV in a modified open shortest path first (OSPF) message.

3. The method of claim 1, wherein the link is a critical link.

4. The method of claim 1, wherein the link is not a critical link.

5. The method of claim 1, wherein the node is a critical node.

6. The method of claim 1, wherein the node is not a critical node.

7. The method of claim 1, further comprising:
    encoding a flooding topology links (FTLK)-TLV representing all of the links between a local node and a number of remote nodes on the flooding topology;
    encoding the FTLK-TLV in a flooding topology opaque LSA; and
    flooding the flooding topology with the flooding topology opaque LSA.

8. The method of claim 1, wherein the backup paths opaque LSA and flooding topology opaque LSA supports one of open shortest path first version 2 (OSPFv2) and open shortest path first version 3 (OSPFv3).

9. The method of claim 1, wherein the flooding is initiated by a leader node of an area, and wherein the backup paths opaque LSA is flooded to all other nodes in the area.

10. A method for determining a flooding topology and backup paths of the flooding topology, comprising:
    detecting a network failure, wherein the network failure is a link failure, a node failure, or both;
    determining a backup path for each link and node on the flooding topology to generate a plurality of backup paths; and
    temporarily adding the backup path for each link to the flooding topology until a new flooding topology determined by a leader node is received by the node.

11. The method of claim 10, wherein the backup path for each link connected to the node is temporarily added to the flooding topology when there is no path on the flooding topology from the node to a remote end node of the link.

12. A network device configured to encode messages of a flooding topology and backup paths of the flooding topology, comprising:
    a network interface configured to send and receive data over a network;
    memory configured to store instructions;
    a processor configured to execute the instructions to:
        detect a network failure, wherein the network failure is a link failure, a node failure, or both;
        determine the backup paths for each link and node on a flooding topology to generate a plurality of backup paths;
        encode backup paths for each link in a link backup path (LBP) data structure or for each node in a node backup path (NBP) data structure;
        encode the LBP data structure in a LBP type-length-value (TLV) or the NBP data structure in a NBP-TLV;
        encode the LBP-TLV or the NBP-TLV in a backup paths opaque link state advertisement (LSA); and
        flood the backup paths opaque LSA onto the flooding topology.

13. The network device of claim 12, wherein the processor is further configured to execute the instructions to encode both the LBP-TLV and the NBP-TLV in a modified open shortest path first (OSPF) message.

14. The network device of claim 12, wherein the link is a critical link.

15. The network device of claim 12, wherein the link is not a critical link.

16. The network device of claim 12, wherein the node is a critical node.

17. The network device of claim 12, wherein the node is not a critical node.

18. The network device of claim 12, wherein the processor is further configured to execute the instructions to:
    encode a flooding topology links (FTLK)-TLV representing all of the links between a local node and a number of remote nodes;
    encode the FTLK-TLV in a flooding topology opaque LSA; and
    flood the flooding topology with the flooding topology opaque LSA.

19. The network device of claim 18, wherein flooding of the flooding topology is initiated by a leader node of an area, and wherein the backup paths opaque LSA is flooded to all other nodes in the area.

20. The network device of claim 18, wherein the backup paths opaque LSA and flooding topology opaque LSA supports one of open shortest path first version 2 (OSPFv2) and open shortest path first version 3 (OSPFv3).

21. A network node for determining a flooding topology and backup paths of the flooding topology, comprising:
    a network interface configured to send and receive data over a network;
    memory configured to store instructions;
    a processor configured to execute the instructions to:
    detect a network failure, wherein the network is one of a link failure, a node failure, or both;
    determine the backup paths for each link and node on a flooding topology to generate a plurality of backup paths; and
    temporarily add the backup path for each link to the flooding topology until a new flooding topology determined by a leader node is received by the node.

22. The network node of claim 21, wherein the backup path for each link connected to the node is temporarily added to the flooding topology when there is no path on the flooding topology from the node to a remote end node of the link.

23. The method of claim 1, wherein the determining the flooding topology following detection of the network failure is performed by a network router.

* * * * *

UNITED STATES PATENT AND TRADEMARK OFFICE
CERTIFICATE OF CORRECTION

| | |
|---|---|
| PATENT NO. | : 11,811,611 B2 |
| APPLICATION NO. | : 17/157540 |
| DATED | : November 7, 2023 |
| INVENTOR(S) | : Huaimo Chen |

It is certified that error appears in the above-identified patent and that said Letters Patent is hereby corrected as shown below:

On the Title Page

Item (71) Applicant: delete "Huawei Technologies Co., Ltd., Guangdong (CN)" and insert -- Huawei Technologies Co., Ltd., Shenzhen (CN) --.

Signed and Sealed this
Twelfth Day of December, 2023

Katherine Kelly Vidal
*Director of the United States Patent and Trademark Office*